United States Patent
Kajio et al.

(10) Patent No.: US 10,836,183 B2
(45) Date of Patent: Nov. 17, 2020

(54) RECORDING DEVICE AND RECORDING SYSTEM

(71) Applicant: Sony Corporation, Tokyo (JP)

(72) Inventors: Yusuke Kajio, Tokyo (JP); Isao Takahashi, Kanagawa (JP); Yuki Oishi, Kanagawa (JP); Masaru Wada, Kanagawa (JP); Kenichi Kurihara, Kanagawa (JP); Taichi Takeuchi, Kanagawa (JP); Satoko Asaoka, Kanagawa (JP); Asuka Tejima, Kanagawa (JP); Nobukazu Hirai, Kanagawa (JP); Yuriko Kaino, Kanagawa (JP); Aya Shuto, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/340,011

(22) PCT Filed: Sep. 13, 2017

(86) PCT No.: PCT/JP2017/033074
§ 371 (c)(1),
(2) Date: Apr. 5, 2019

(87) PCT Pub. No.: WO2018/070176
PCT Pub. Date: Apr. 19, 2018

(65) Prior Publication Data
US 2019/0240993 A1    Aug. 8, 2019

(30) Foreign Application Priority Data

Oct. 12, 2016  (JP) .................................. 2016-200995

(51) Int. Cl.
*B41J 2/475*  (2006.01)
*B41M 5/28*  (2006.01)
(Continued)

(52) U.S. Cl.
CPC ............. *B41J 2/475* (2013.01); *B41J 2/4753* (2013.01); *B41J 5/30* (2013.01); *B41J 5/32* (2013.01);
(Continued)

(58) Field of Classification Search
CPC ..... B41J 2/475; B41J 5/30; B41J 29/38; B41J 2/4753; B41J 5/32; G06F 3/1285;
(Continued)

(56) References Cited

U.S. PATENT DOCUMENTS 6,441,836 B1* 8/2002 Takasu ................ G06F 15/0266
715/835
2006/0081696 A1* 4/2006 Sakurai .................. G06Q 10/08
235/375
(Continued)

FOREIGN PATENT DOCUMENTS

JP  2004-074584  3/2004
JP  2004-155010  6/2004
(Continued)

OTHER PUBLICATIONS

International Search Report and Written Opinion issued in connection with International Patent Application No. PCT/JP2017/033074, dated Oct. 17, 2017. (14 pages).

*Primary Examiner* — Huan H Tran
*Assistant Examiner* — Alexander D Shenderov
(74) *Attorney, Agent, or Firm* — K&L Gates LLP

(57) ABSTRACT

A recording device according to the present disclosure includes: a writer that rewrites schedule information visibly recorded on a recording medium and corresponding to a time from first schedule information to second schedule information; and a generator that generates the second schedule information on the basis of a time.

18 Claims, 23 Drawing Sheets

(51) Int. Cl.
*G06F 3/12* (2006.01)
*B41J 29/38* (2006.01)
*B41J 5/30* (2006.01)
*B41J 5/32* (2006.01)

(52) U.S. Cl.
CPC ............. *B41J 29/38* (2013.01); *B41M 5/28* (2013.01); *G06F 3/1206* (2013.01); *G06F 3/1243* (2013.01); *G06F 3/1285* (2013.01); *G06F 3/1286* (2013.01)

(58) Field of Classification Search
CPC .... G06F 3/1286; G06F 3/1243; G06F 3/1206; G06F 2206/1512; B41M 5/28
USPC .......................................................... 347/224
See application file for complete search history.

(56) References Cited

U.S. PATENT DOCUMENTS

| 2007/0142179 A1 | 6/2007 | Terao et al. |
| 2014/0339300 A1 | 11/2014 | Chen |

FOREIGN PATENT DOCUMENTS

| JP | 2006-126173 | 5/2006 |
| JP | 2006-126173 A | 5/2006 |
| JP | 2007-164623 | 6/2007 |
| JP | 2007-164623 A | 6/2007 |
| JP | 2015-060479 | 3/2015 |
| JP | 2015-060479 A | 3/2015 |

* cited by examiner

[FIG. 1]
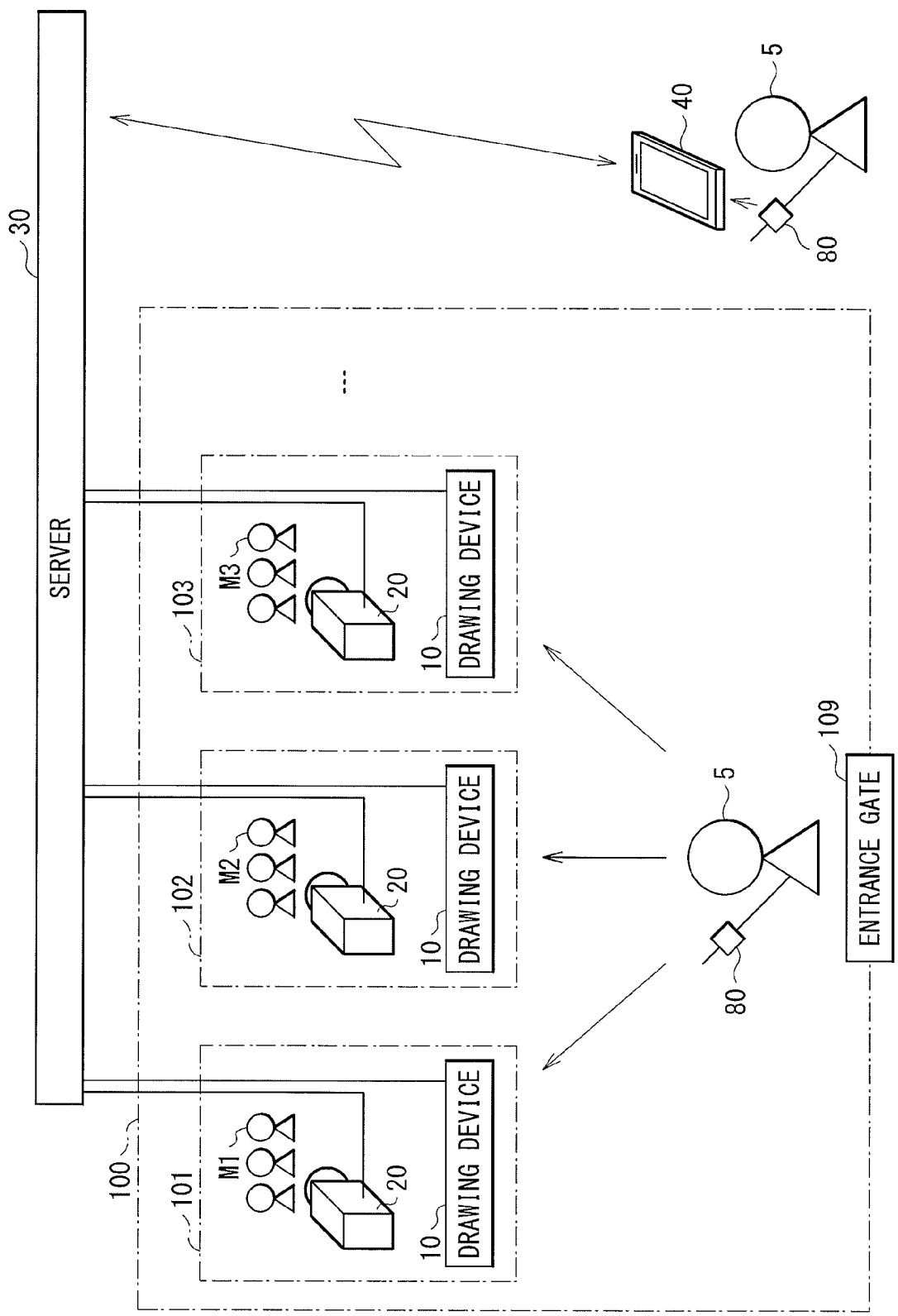

[ FIG. 2 ]
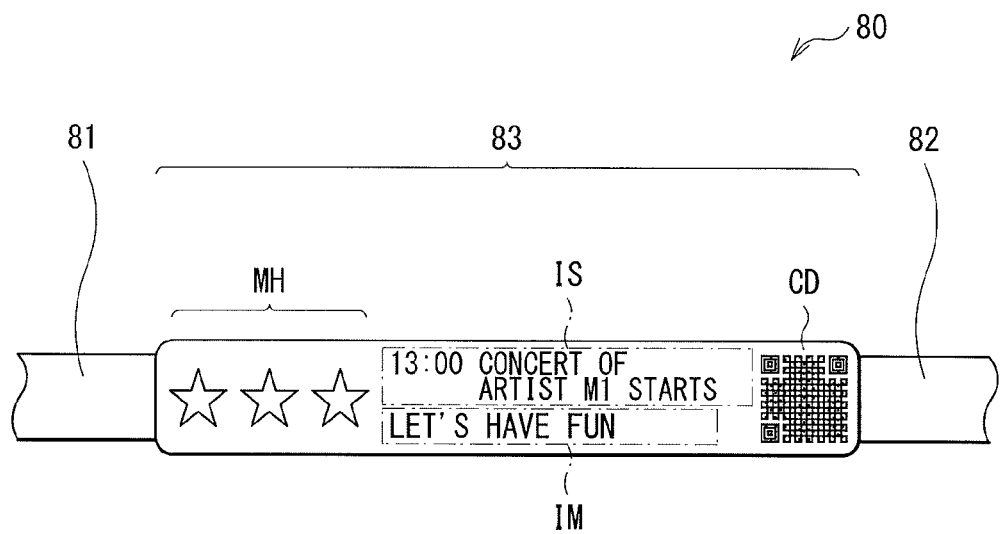
[ FIG. 3 ]
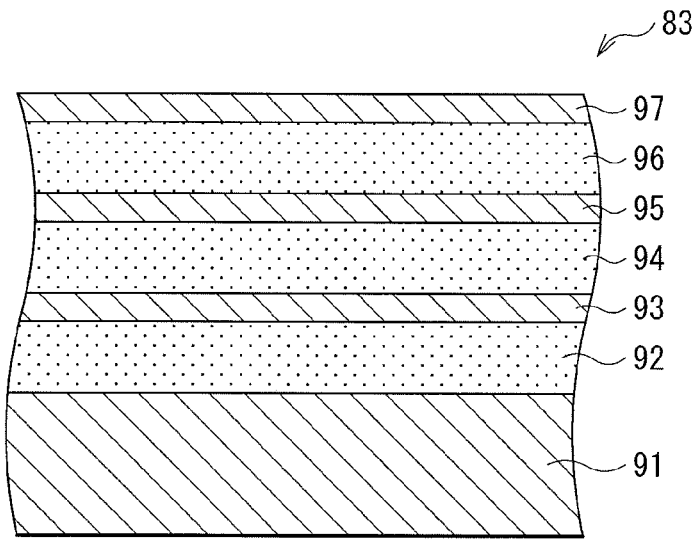

[FIG. 4A]
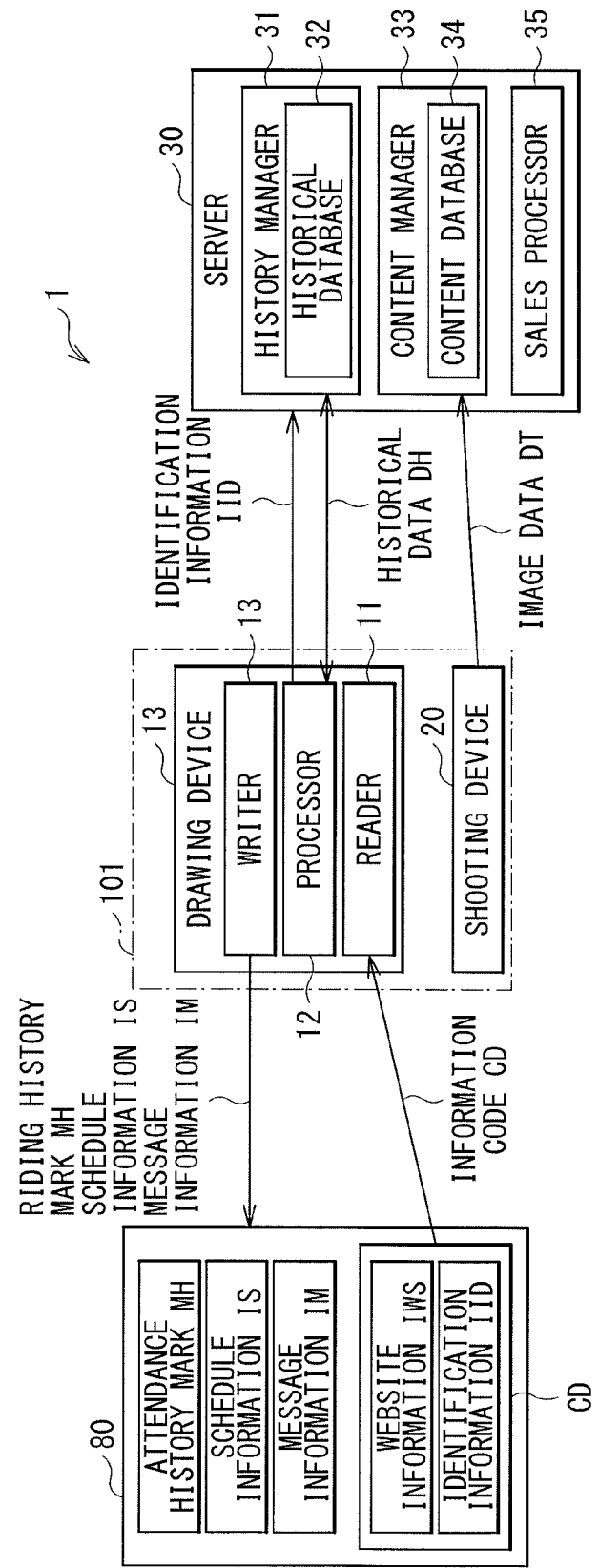

[FIG. 4B]
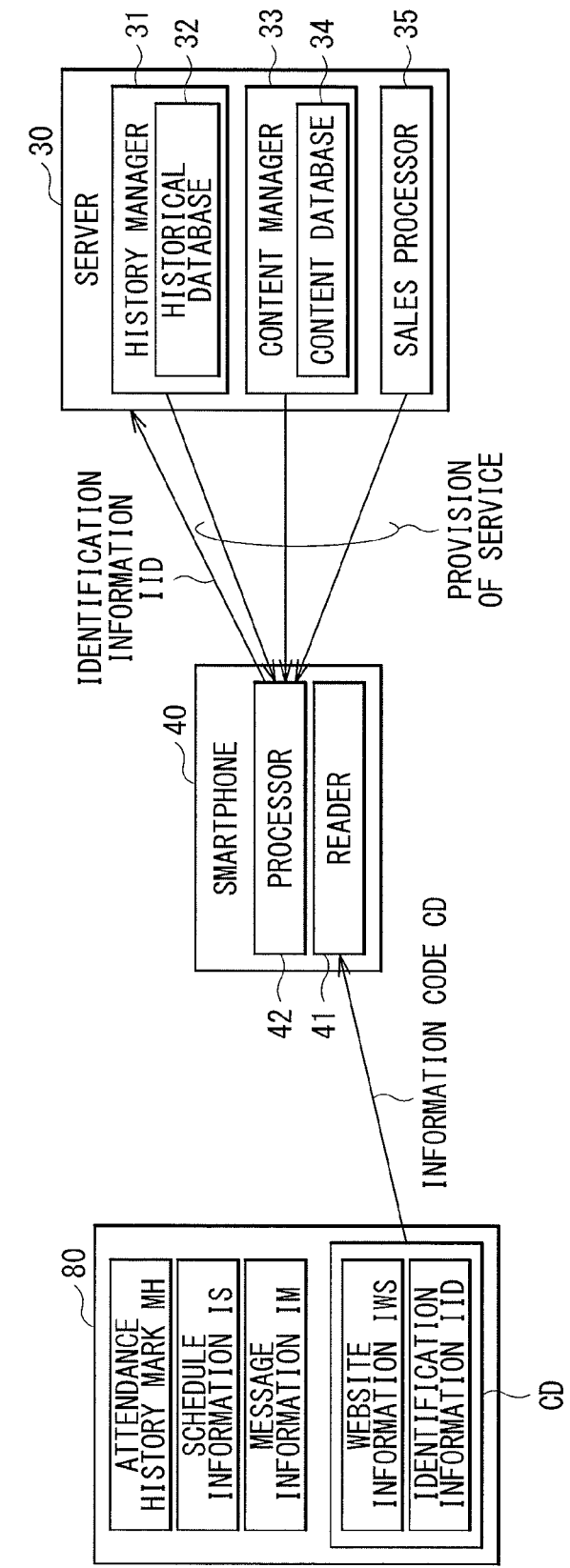

[ FIG. 5 ]
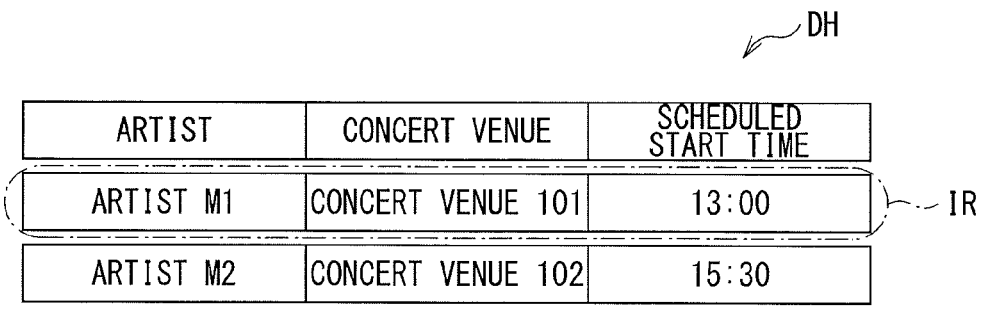

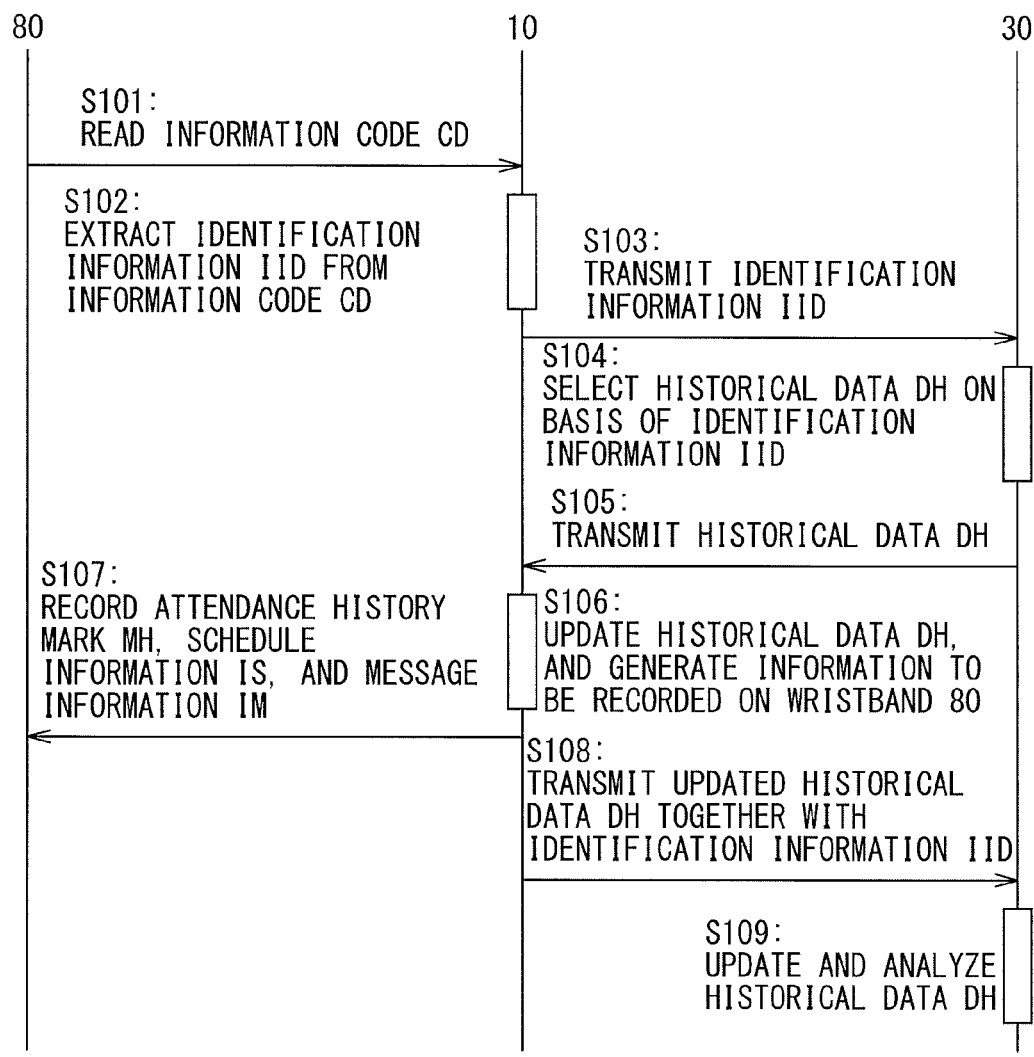
[FIG. 6]

[ FIG. 7 ]
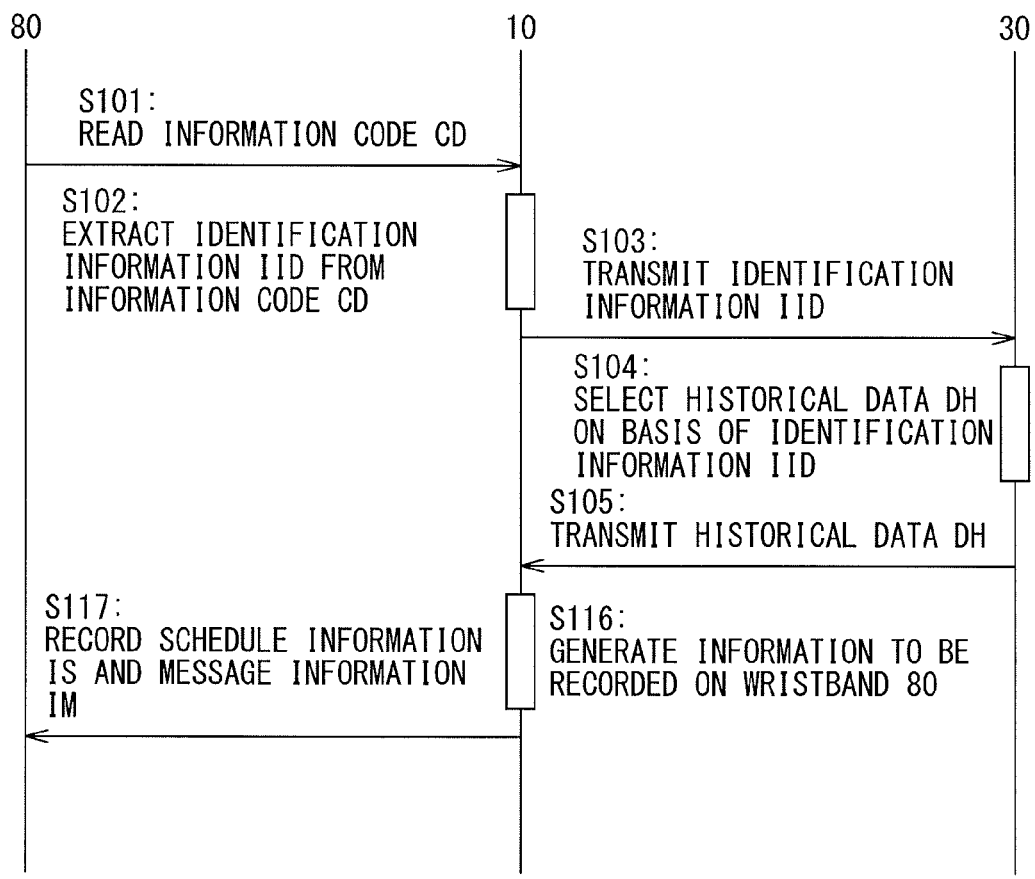
[ FIG. 8 ]
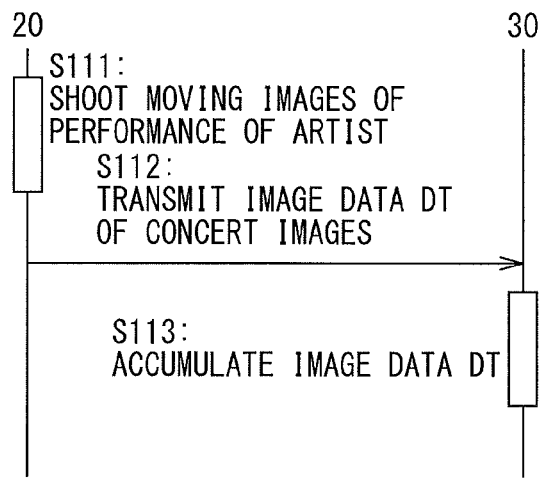

[ FIG. 9 ]
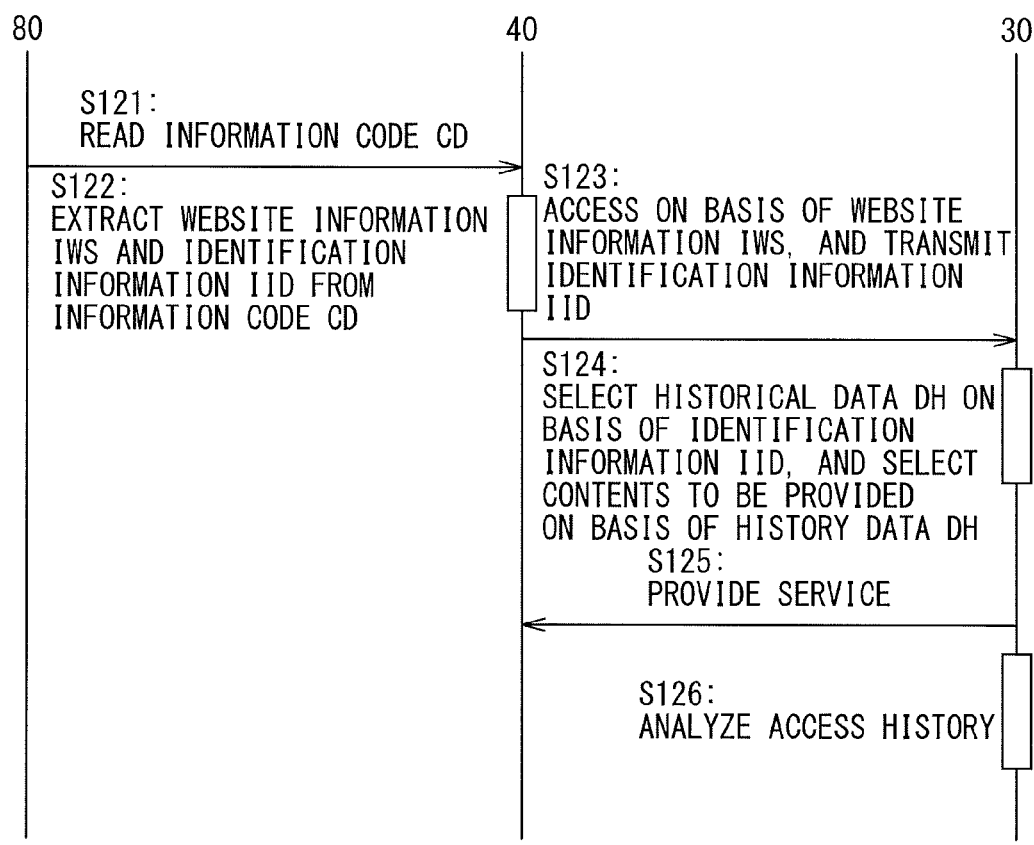

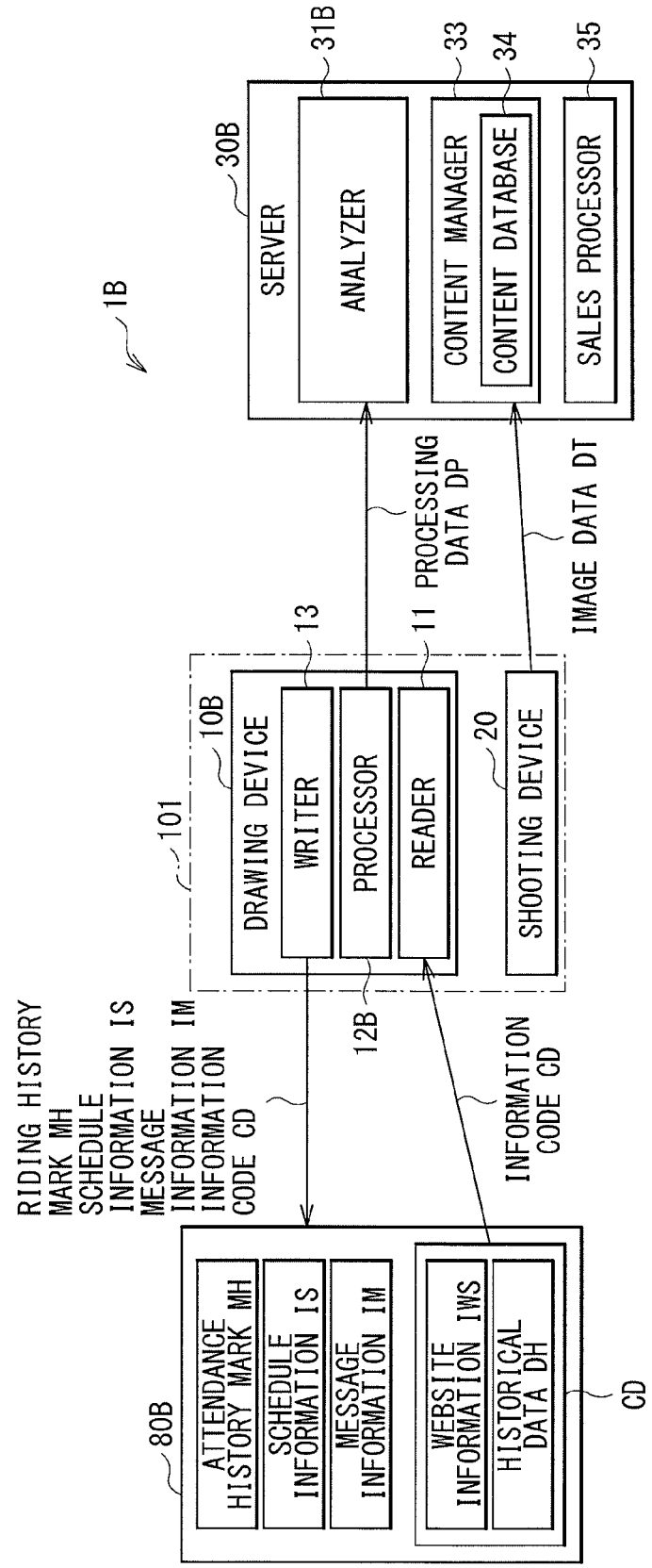
[FIG. 10A]

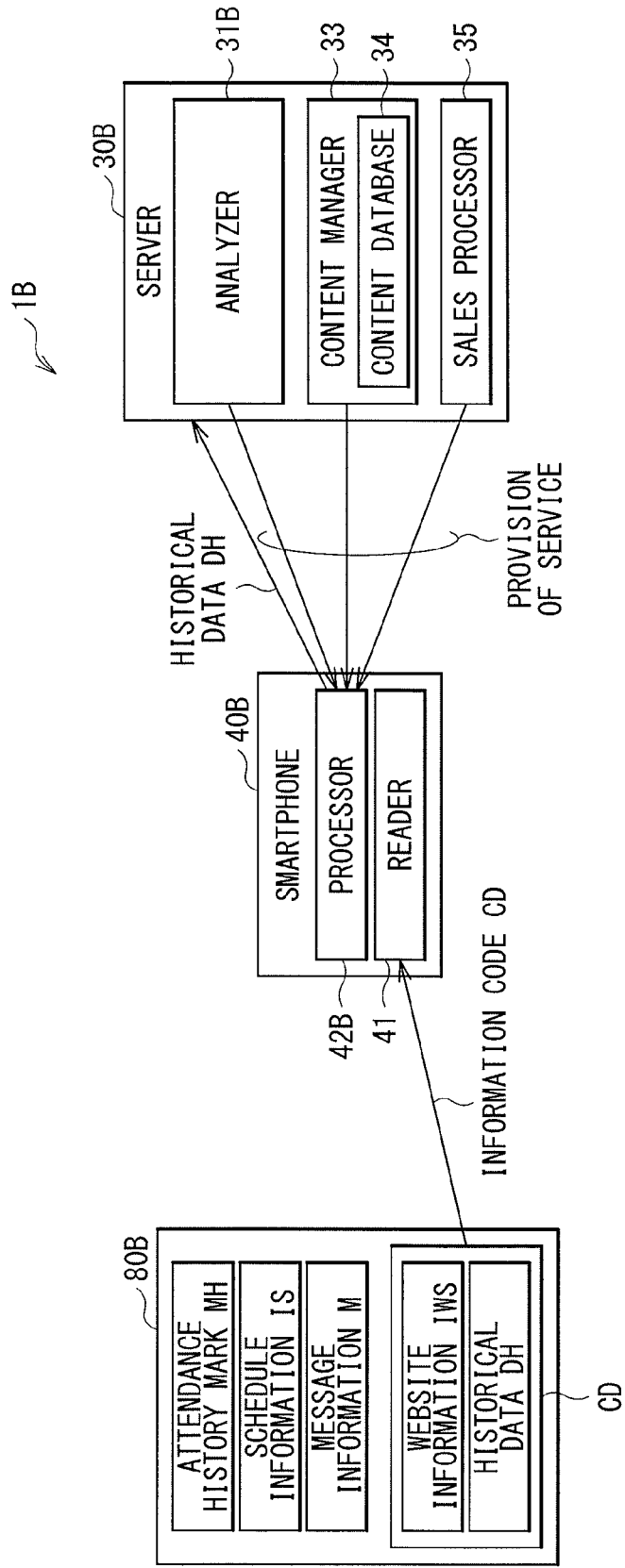
[ FIG. 10B ]

[ FIG. 11 ]
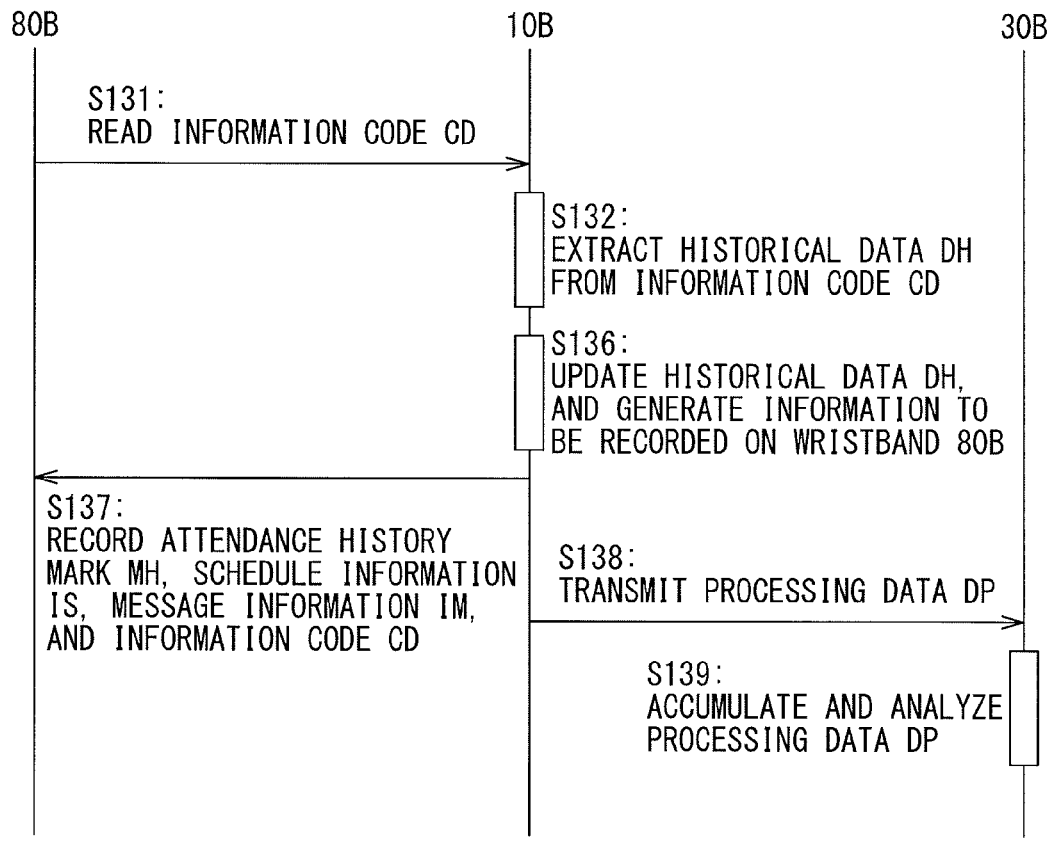
[ FIG. 12 ]
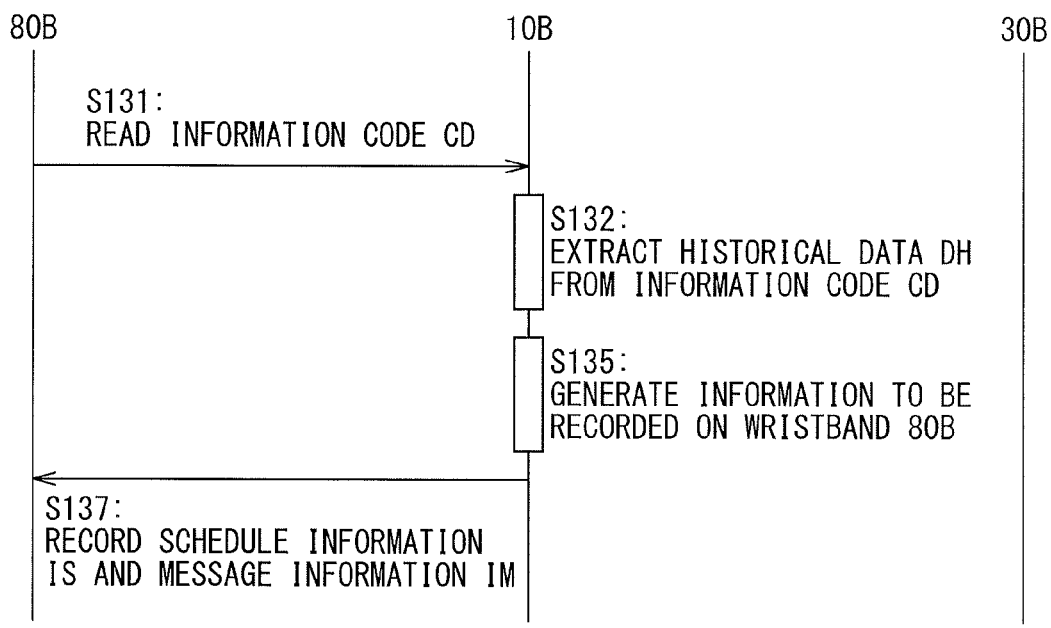

[ FIG. 13 ]
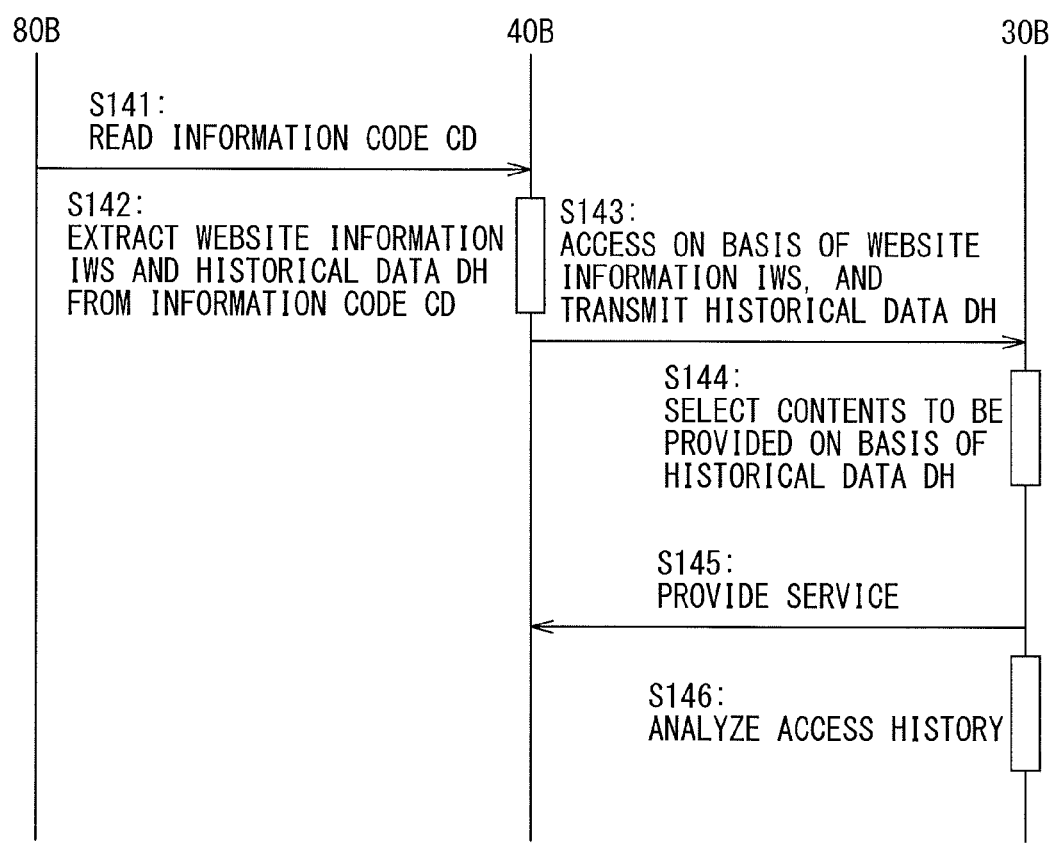

[ FIG. 14 ]
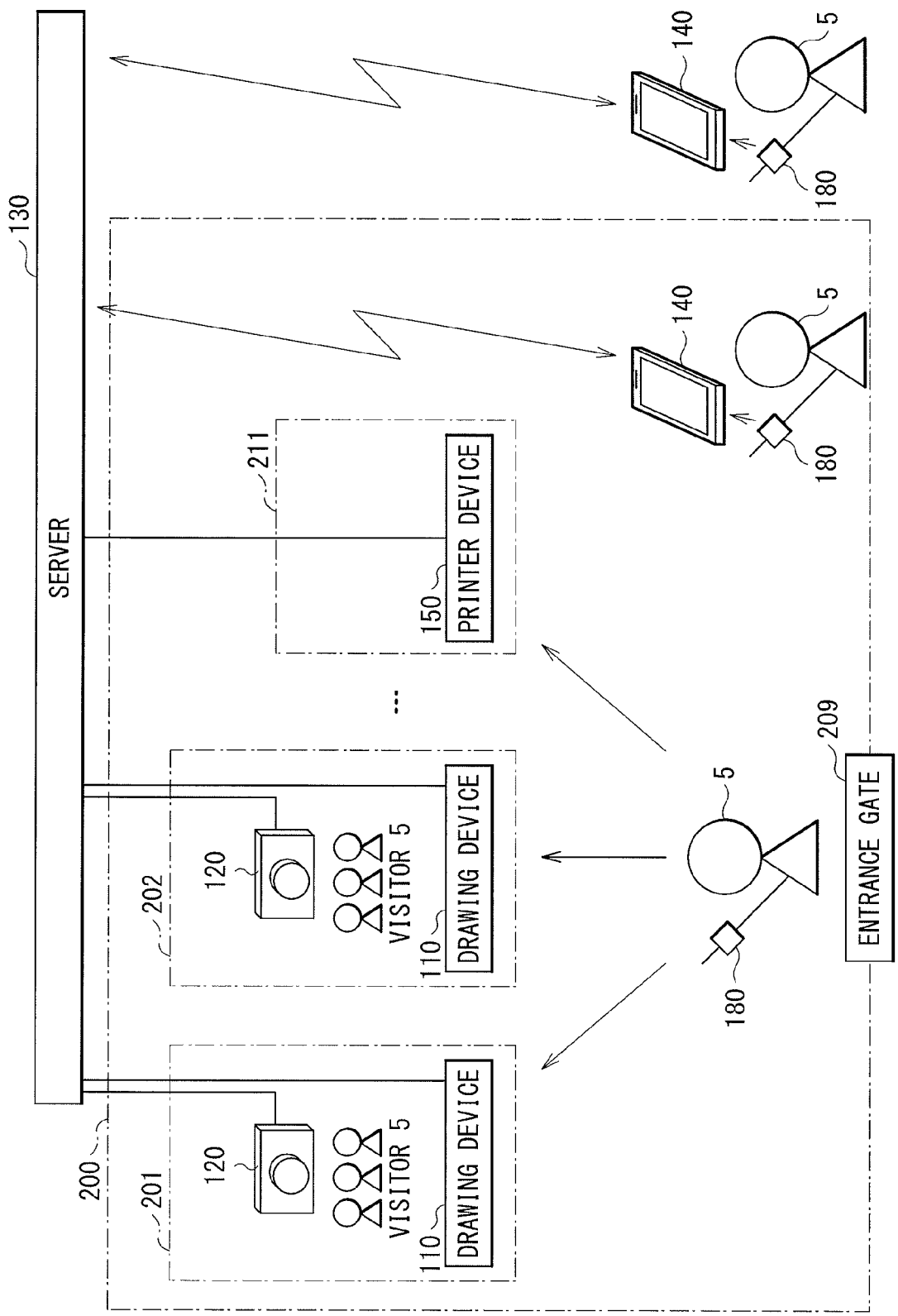

[ FIG. 15 ]
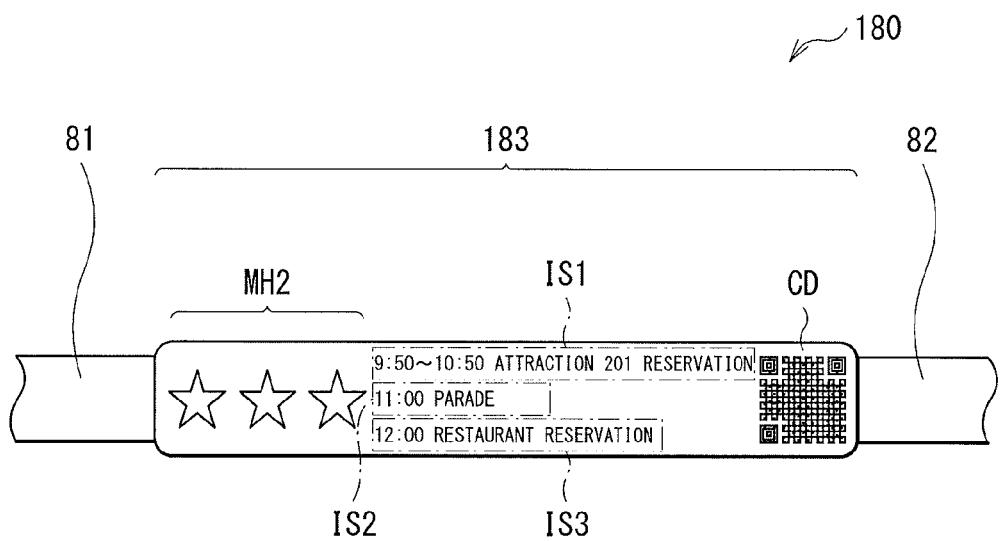

[ FIG. 16A ]
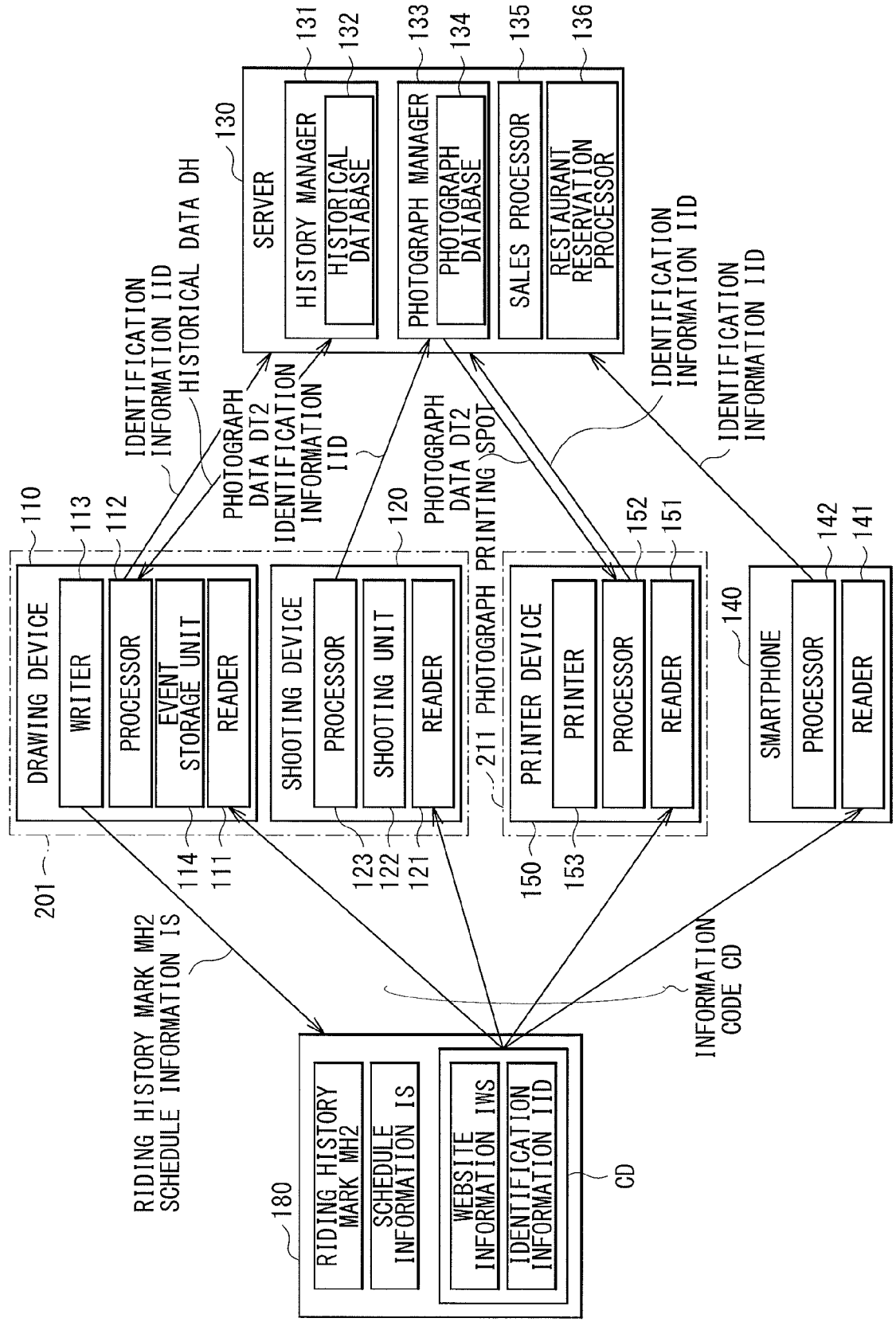

[ FIG. 16B ]
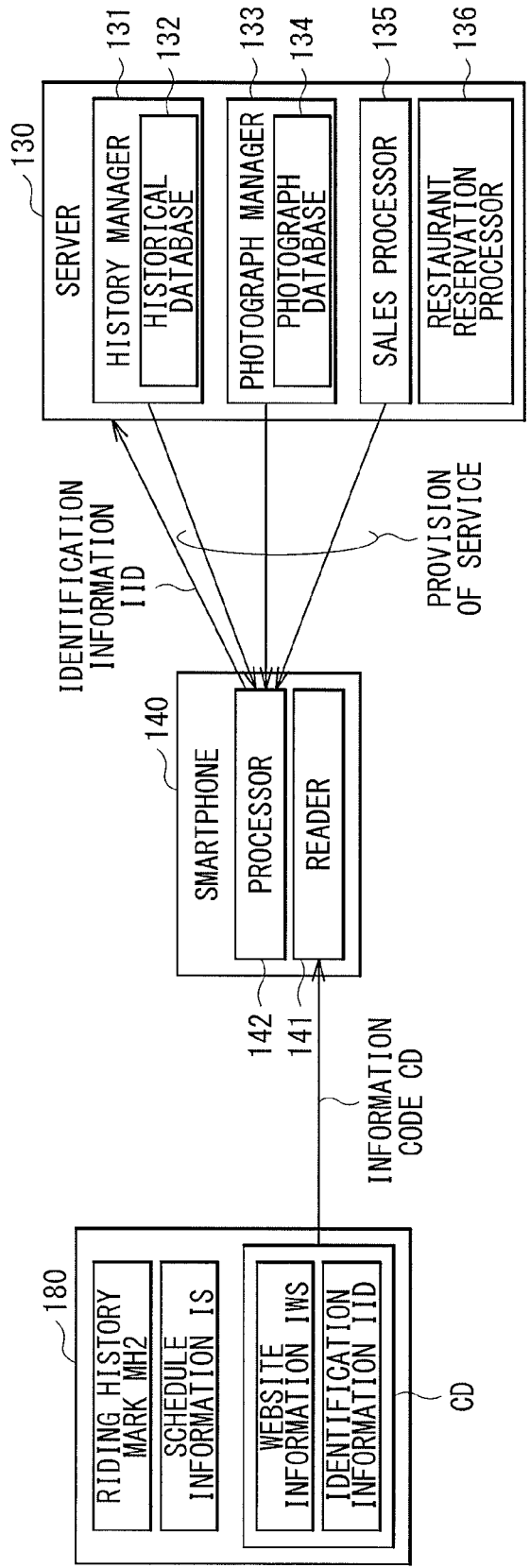

| EVENT | PLACE | SCHEDULED TIME |
|---|---|---|
| ⋮ | ⋮ | ⋮ |
| PARADE | ALL OVER PARK | 11:00 |
| BRASS BAND PERFORMANCE | CONCOURSE | 14:00 |
| PARADE | ALL OVER PARK | 15:00 |
| ⋮ | ⋮ | ⋮ |

| PROCESSING | PLACE | PROCESSING TIME | SCHEDULED TIME |
|---|---|---|---|
| ⋮ | ⋮ | ⋮ | ⋮ |
| ATTRACTION RIDING RESERVATION | ATTRACTION 201 | 8:30 | 9:50~10:50 |
| RESTAURANT RESERVATION | RESTAURANT 221 | 9:00 | 12:00 |
| RIDING ATTRACTION | ATTRACTION 202 | 9:10 | — |
| ⋮ | ⋮ | ⋮ | ⋮ |

[ FIG. 19 ]
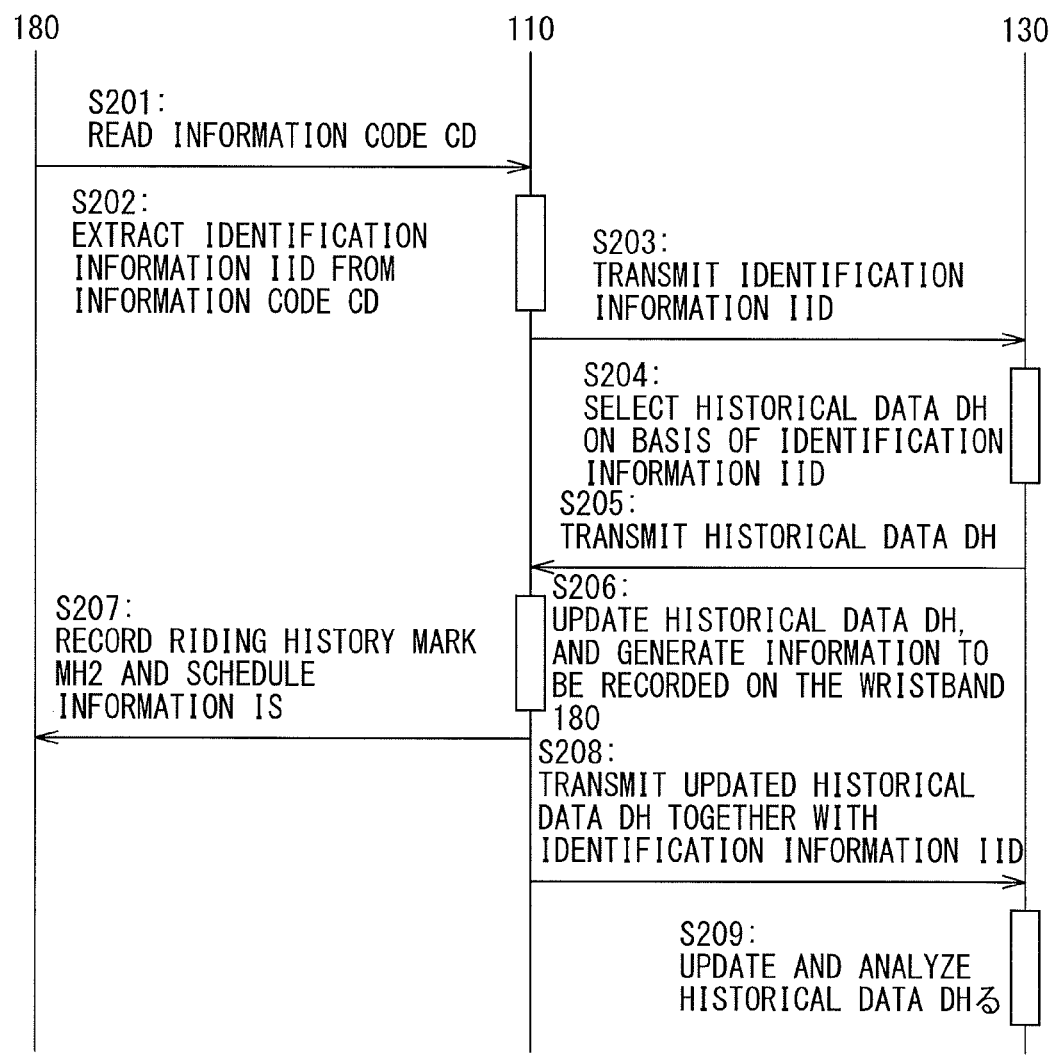

[ FIG. 20 ]
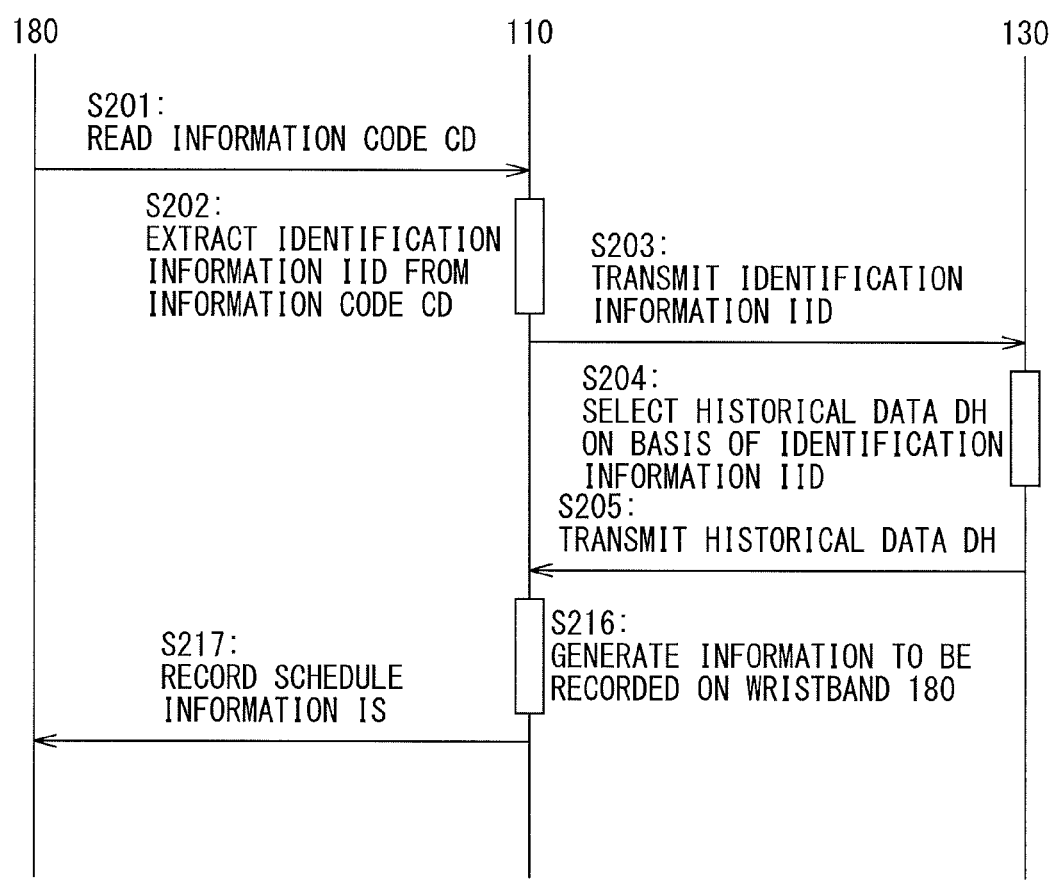

[ FIG. 21 ]
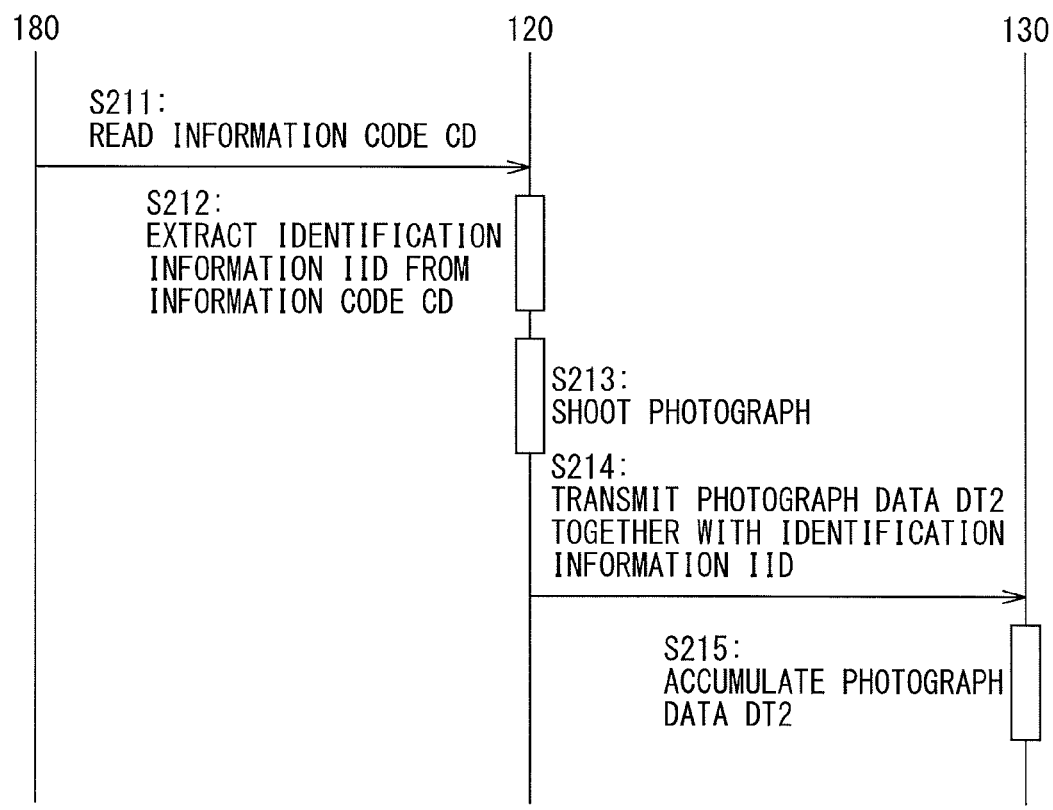

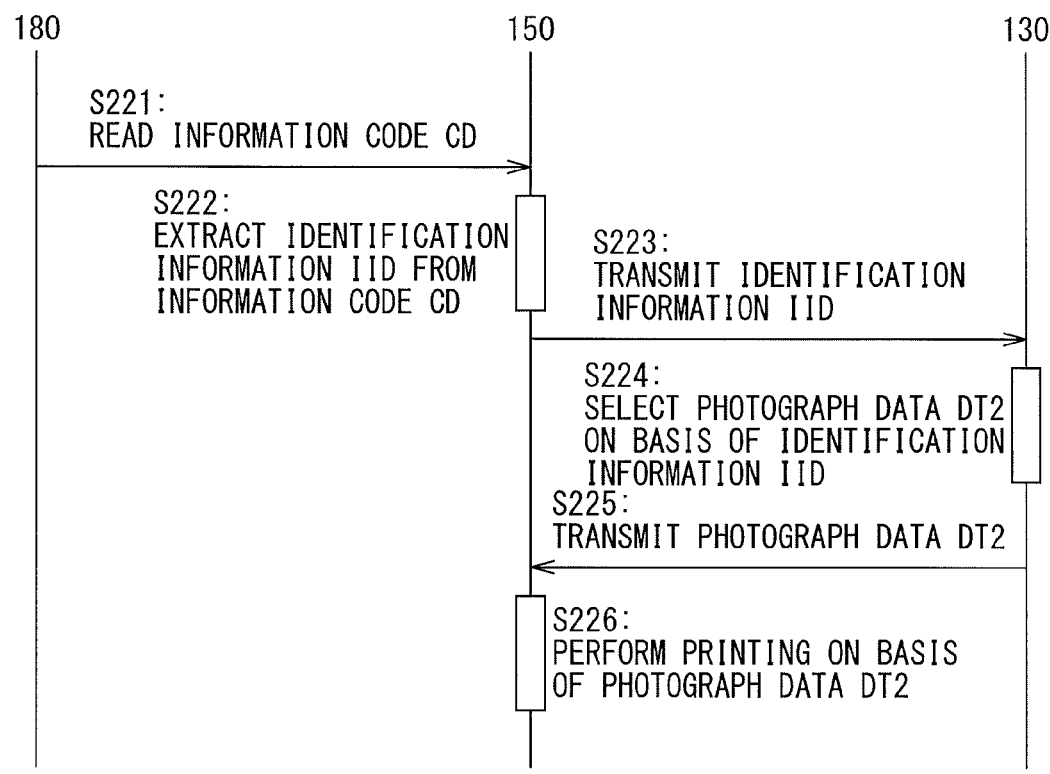

[ FIG. 23 ]
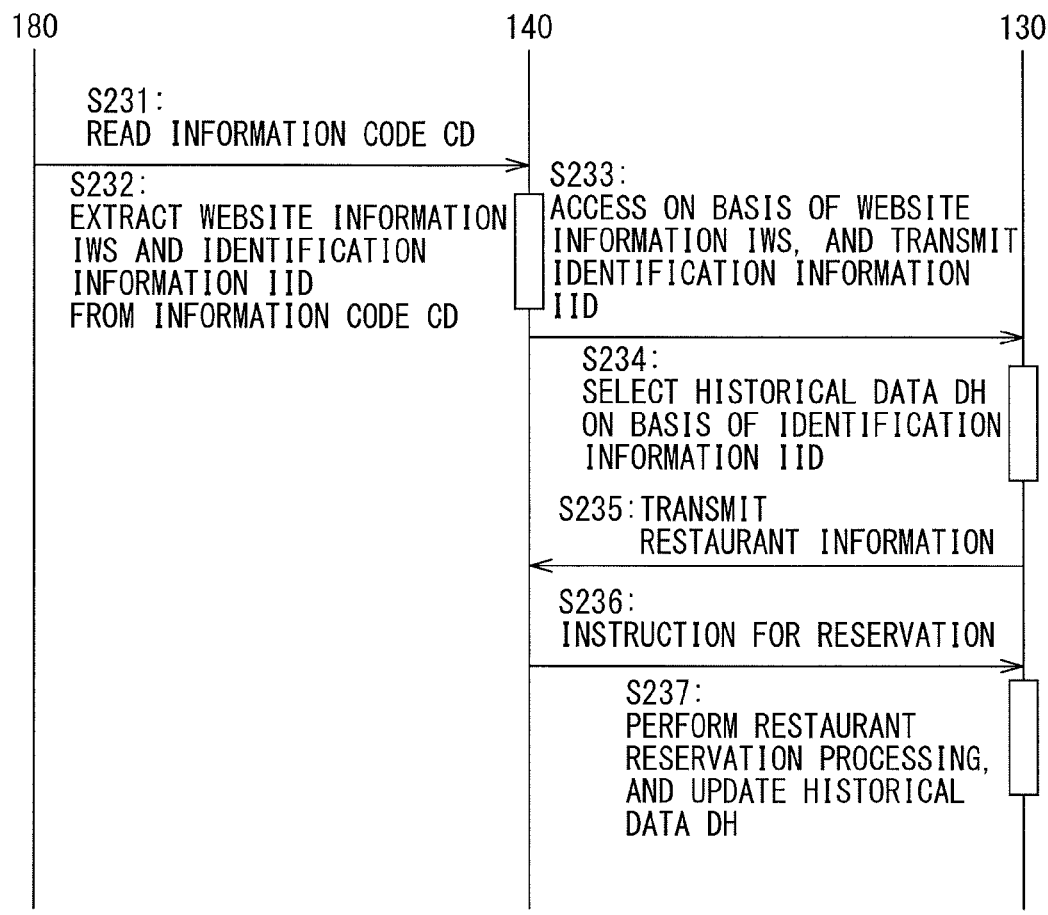

[ FIG. 24 ]
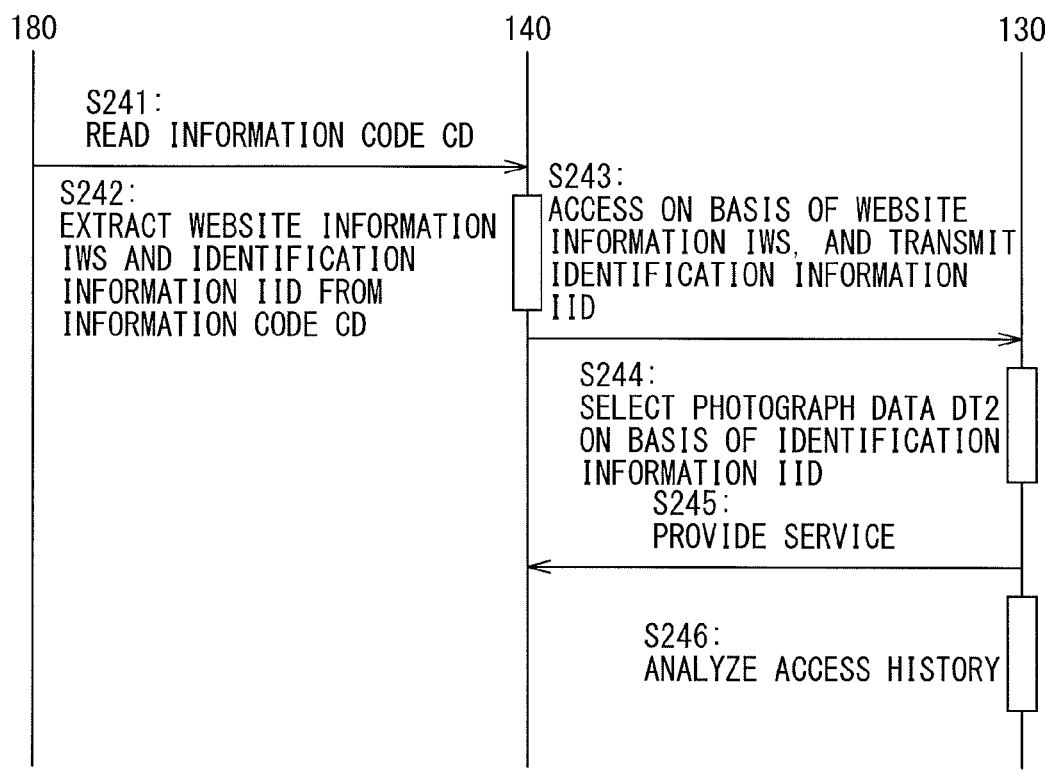

RECORDING DEVICE AND RECORDING SYSTEM

CROSS-REFERENCE TO RELATED APPLICATIONS

The present application claims the benefit of International Application No. PCT/JP2017/033074, filed Sep. 13, 2017, which claims priority to Japanese Application No. 2016-200995, filed Oct. 12, 2016, the disclosures of which are incorporated herein by reference.

BACKGROUND

The present disclosure relates to a recording device that records information on a recording medium, and a recording system including such a recording device.

BACKGROUND ART

In frequent cases, there is a need to rewrite information such as characters and graphics on a recording medium on which such information are visibly recorded. For example, PTL 1 and PTL 2 each disclose a recording medium on which information is rewritable by heat.

Incidentally, an admission ticket (pass) is issued at an event venue, for example, and a user holds the issued admission ticket at the event venue.

SUMMARY

In some cases, there is a need for a user to know, for example, various information about an event in such an event venue. Hence, user convenience is expected to be enhanced through using an information-rewritable recording medium in the event venue, for example.

It is desirable to provide a recording device and a recording system that make it possible to enhance user convenience.

A recording device according to an embodiment of the present disclosure includes: a writer and a generator. The writer rewrites schedule information visibly recorded on a recording medium and corresponding to a time from first schedule information to second schedule information. The generator generates the second schedule information on the basis of a time.

A first recording system according to an embodiment of the present disclosure includes a recording device and an information processing device. The recording device includes a writer and a generator. The writer rewrites schedule information visibly recorded on a recording medium and corresponding to a time from first schedule information to second schedule information. The generator generates the second schedule information on the basis of a time and historical data corresponding to the recording medium. The information processing device accumulates the historical data.

A second recording system according to an embodiment of the present disclosure includes: a recording device and an information processing device. The recording device includes a writer and a generator. The writer rewrites schedule information visibly recorded on a recording medium and corresponding to a time from first schedule information to second schedule information. The generator generates the second schedule information on the basis of a time and historical data corresponding to the recording medium. The information processing device performs predetermined processing corresponding to the historical data.

In the recording device, the first recording system, and the second recording system according to the embodiments of the present disclosure, the schedule information corresponding to the time is visibly recorded on the recording medium. The schedule information is rewritten from the first schedule information to the second schedule information. The second schedule information is generated on the basis of the time.

According to the recording device, the first recording system, and the second recording system according to the embodiments of the present disclosure, the schedule information visibly recorded on the recording medium and corresponding to the time is rewritten, which makes it possible to enhance user convenience. It is to be noted that effects described here are not necessarily limited and may include any of effects described in the present disclosure.

BRIEF DESCRIPTION OF THE DRAWINGS

FIG. 1 is an explanatory diagram illustrating an example of a music festival according to a first embodiment of the present disclosure.

FIG. 2 is an explanatory diagram illustrating a configuration example of a wristband illustrated in FIG. 1.

FIG. 3 is a cross-sectional view of a schematic cross-sectional configuration of an information recorder illustrated in FIG. 2.

FIG. 4A is a configuration diagram illustrating a configuration example of a recording system according to the first embodiment.

FIG. 4B is another configuration diagram illustrating a configuration example of the recording system according to the first embodiment.

FIG. 5 is an explanatory diagram illustrating a configuration example of historical data illustrated in FIG. 4A.

FIG. 6 is a sequence diagram illustrating an operation example of the recording system illustrated in FIGS. 4A and 4B.

FIG. 7 is another sequence diagram illustrating an operation example of the recording system illustrated in FIGS. 4A and 4B.

FIG. 8 is another sequence diagram illustrating an operation example of the recording system illustrated in FIGS. 4A and 4B.

FIG. 9 is another sequence diagram illustrating an operation example of the recording system illustrated in FIGS. 4A and 4B.

FIG. 10A is a configuration diagram illustrating a configuration example of a recording system according to a modification example of the first embodiment.

FIG. 10B is another configuration diagram illustrating a configuration example of the recording system according to the modification example of the first embodiment.

FIG. 11 is a sequence diagram illustrating an operation example of the recording system illustrated in FIGS. 10A and 10B.

FIG. 12 is another sequence diagram illustrating an operation example of the recording system illustrated in FIGS. 10A and 10B.

FIG. 13 is another sequence diagram illustrating an operation example of the recording system illustrated in FIGS. 10A and 10B.

FIG. 14 is an explanatory diagram illustrating an example of an amusement park according to a second embodiment.

FIG. 15 is an explanatory diagram illustrating a configuration example of a wristband illustrated in FIG. 14.

FIG. 16A is a configuration diagram illustrating a configuration example of a recording system according to the second embodiment.

FIG. 16A is another configuration diagram illustrating a configuration example of the recording system according to the second embodiment.

FIG. 17 is an explanatory diagram illustrating a configuration example of event schedule data.

FIG. 18 is an explanatory diagram illustrating a configuration example of historical data illustrated in FIG. 16A.

FIG. 19 is a sequence diagram illustrating an operation example of the recording system illustrated in FIGS. 16A and 16B.

FIG. 20 is another sequence diagram illustrating an operation example of the recording system illustrated in FIGS. 16A and 16B.

FIG. 21 is another sequence diagram illustrating an operation example of the recording system illustrated in FIGS. 16A and 16B.

FIG. 22 is another sequence diagram illustrating an operation example of the recording system illustrated in FIGS. 16A and 16B.

FIG. 23 is another sequence diagram illustrating an operation example of the recording system illustrated in FIGS. 16A and 16B.

FIG. 24 is another sequence diagram illustrating an operation example of the recording system illustrated in FIGS. 16A and 16B.

DETAILED DESCRIPTION

In the following, some embodiments of the present disclosure are described in detail with reference to the drawings. It is to be noted that description is given in the following order.
1. First Embodiment (Example of Music Festival)
2. Second Embodiment (Example of Amusement Park)

1. First Embodiment

Application Example

FIG. 1 illustrates an example of a musical festival to which a recording system (a recording system 1) according to a first embodiment is applied. A venue of the music festival (a music festival venue 100) includes a plurality of concert venues 101, 102, 103, and so on, and a visitor 5 is able to visit a plurality of concert venues to attend concerts of various artists.

The visitor 5 receives a wristband 80 at an entrance gate 109 of the music festival venue 100. The wristband 80 functions as an admission ticket (pass) in the music festival venue 100. The visitor 5 wears the wristband 80 around his wrist to carry the wristband 80 in the music festival venue 100. The visitor 5 goes to a concert venue where a concert the visitor 5 wants to attend, pays an attendance fee for the concert, and holds the wristband 80 over a drawing device 10. Various information is thereby visibly recorded on the wristband 80. At each of the concert venues, a shooting device 20 shoots moving images of performance of the artist, and supplies image data DT of shot concert images to a server 30. Thus, various concert images are accumulated on the server 30. The visitor 5 uses an information code CD (to be described later) recorded on the wristband 80, for example, for a duration of the music festival and within a predetermined period after end of the music festival, which allows the visitor 5 to access the server 30 through use of, for example, a smartphone 40. This allows the visitor 5 to obtain, with or without charge, concert images of the concert the visitor 5 himself has attended, for example. Moreover, as described later, access to the server 30 allows the visitor 5 to receive various services such as distribution of a video message of an artist and sales of goods.

As described above, various information is visibly recorded on the wristband 80. Next, the wristband 80 is described in detail.

FIG. 2 illustrates a configuration example of the wristband 80. The wristband 80 includes a belt sections 81 and 82 and an information recorder 83. The belt sections 81 and 82 have a band shape, and have ends (not illustrated) that are connectable to each other. On the information recorder 83, various information is visibly recorded. In this example, an attendance history mark MH, schedule information IS, message information IM, and the information code CD are recorded on the information recorder 83.

The attendance history mark MH indicates the number of concerts the visitor 5 wearing the wristband 80 has attended in the music festival venue 100. In this example, the more concerts the visitor attends, the more star-shaped marks are recorded as the attendance history mark MH. It is to be noted that the attendance history mark MH is not limited thereto, and may be any mark as long as the degree of attendance at concerts is objectively visible. Specifically, for example, a color of the mark may be changed depending on the number of concerts the visitor 5 has attended, for example.

In this example, the schedule information IS indicates a schedule of concerts the visitor 5 is scheduled to attend. Specifically, in a case where the visitor 5 pays an attendance fee for one certain concert, information about the concert is recorded as the schedule information IS. In this example, the schedule information IS includes a scheduled time of the concert, and information about a name of an artist who is to perform the concert. It is to be noted that the schedule information IS is not limited thereto, and may include, for example, information about a concert venue where the concert is to be performed. Moreover, for example, in a case where the visitor 5 pays an attendance fee for a plurality of concerts, information about a first concert scheduled to start at a time after the current time of the plurality of concerts is recorded as the schedule information IS. This makes it possible for the visitor 5 to check information about a concert the visitor 5 himself is scheduled to attend through checking the schedule information IS on the wristband 80. In other words, the wristband 80 functions as a reminder for the visitor 5 wearing the wristband 80.

The message information IM indicates, for example, a message from an artist and a message from an operator of the music festival.

Various information is recorded on the information code CD with use of a visible pattern (a so-called two-dimensional code in this example). In this example, the information code CD is recorded in advance on the wristband 80. Identification information IID for identification of the wristband 80 and website information IWS for access to the server 30 are recorded on the information code CD. Accordingly, for example, as described later, it is possible for the drawing device 10 to read the information code CD, and record information on the wristband 80 on the basis of the identification information IID included in the information code CD. Moreover, for example, the visitor 5 operates the smartphone 40 to read the information code CD and access the server 30 on the basis of the website information IWS included in the information code CD, thereby allowing the visitor 5 to receive various services provided by the server 30.

FIG. 3 illustrates a configuration example of the information recorder 83. The information recorder 83 includes a base 91, recording layers 92, 94, and 96, heat insulation layers 93 and 95, and a protective layer 97. The recording layer 92, the heat insulation layer 93, the recording layer 94, the heat insulation layer 95, the recording layer 96, and the protective layer 97 are formed in this order on a surface of the base 91.

The base 91 serves as a substrate used to form respective layers on the surface thereof. For example, using the same material as the belt sections 81 and 82 of the wristband 80 makes it possible to configure the base 91 integrally with the belt sections 81 and 82. The base 91 may allow light to pass therethrough or may not allow light to pass therethrough. In a case where the base 91 does not allow light to pass therethrough, a color of the surface of the base 91 may be, for example, write or a color other than white.

The recording layers 92, 94, and 96 have a state that is reversibly switchable between a colored state and a colorless state. The recording layers 92, 94, and 96 are colored with different colors from one another in the colored state. Specifically, in this example, the recording layer 92 is capable of being colored with magenta; the recording layer 94 is capable of being colored with cyan; and the recording layer 96 is capable of being colored with yellow. It is to be noted that the recording layers 92, 94, and 96 are not limited thereto, and three recording layers 92, 94, and 96 may correspond to the three colors (magenta, cyan, and yellow) in any way. Moreover, the recording layers 92, 94, and 96 are transparent in the colorless state. This makes it possible for the information recorder 83 to record information with use of a color in a wide color gamut.

Each of the recording layers 92, 94, and 96 is configurable through including a leuco dye, for example. In this case, each of the recording layers 92, 94, and 96 is configurable through including, for example, an developer, a photothermal conversion material, and a polymer in addition to the leuco dye. The leuco dye is combined with the developer by heat to be switched to the colored state, or is separated from the developer to be switched to the colorless state. The leuco dyes of the three recording layers 92, 94, and 96 have colors in the colored state different from one another. The photothermal conversion material absorbs infrared light to generate heat. Wavelengths of infrared light absorbed by the photothermal conversion materials of the three recording layers 92, 94, and 96 are different from one another.

The heat insulation layer 93 suppresses heat conduction between the recording layer 92 and the recording layer 94. The heat insulation layer 95 suppresses heat conduction between the recording layer 94 and the recording layer 96. The protective layer 97 protects a surface of the information recorder 83. The heat insulation layers 93 and 95, and the protective layer 97 are configured using a transparent material.

This configuration makes it possible to visibly record various information on the wristband 80. Specifically, in a case where information (a character and a graphic) is recorded on the information recorder 83, the information recorder 83 is irradiated with infrared light on the basis of a pattern of the character and a pattern of the graphic. The wavelength of the infrared light is set to a wavelength corresponding to a color of the character or the graphic desired to be recorded. In each of the recording layers 92, 94, and 96, the photothermal conversion material absorbs infrared light with a wavelength corresponding to the photothermal conversion material to generate heat. Thereafter, the leuco dye is combined with the developer by the heat generated by the photothermal conversion material to be switched to the colored state, or is separated from the developer by the heat to be switched to the colorless state. Thus, various information is visibly recorded on the wristband 80. Moreover, the visibly recorded information is rewritable on the wristband 80.

Configuration Example

Next, description is given of the recording system 1 that records information on the wristband 80 in the music festival.

FIGS. 4A and 4B illustrate a configuration example of the recording system 1. FIG. 4A illustrates a portion, in which processing is performed for the duration of the music festival, of the recording system 1, and FIG. 4B illustrates a portion, in which processing is performed for the duration of the music festival and within a predetermined period after the end of the music festival, of the recording system 1.

As illustrated in FIGS. 4A and 4B, the recording system 1 includes the drawing device 10, the shooting device 20, the server 30, and the smartphone 40. It is to be noted that it is possible for the recording system 1 to include a plurality of drawing devices 10 and a plurality of shooting devices 20 as illustrated in FIG. 1; however, FIG. 4A illustrates only one drawing device and one shooting device 20 provided at the concert venue 101 for convenience of description.

The drawing device 10 (FIG. 4A) is, for example, a device possessed by the operator of the music festival, and records information on the wristband 80. Moreover, the drawing device 10 also has a function of reading the information code CD from the wristband 80. In this example, the drawing device 10 is provided at each of the concert venues 101, 102, 103, and so on, as illustrated in FIG. 1. The drawing device 10 includes a reader 11, a processor 12, and a writer 13.

The reader 11 reads the information code CD from the wristband 80, and is configured with use of, for example, a camera, etc.

The processor 12 generates information (the attendance history mark MH, the schedule information IS, and the message information IM) to be recorded on the wristband 80 on the basis of the information code CD. Specifically, the processor 12 first extracts the identification information IID from the information code CD read by the reader 11, and supplies the identification information IID to the server 30. Thereafter, the processor 12 generates the information to be recorded on the wristband 80 on the basis of the historical data DH supplied from the server 30 and corresponding to the identification information IID.

FIG. 5 illustrates an example of the historical data DH. The historical data DH indicates a history of attendance application for the concert made by the visitor 5. The historical data DH includes attendance application information IR. In this example, the attendance application information IR includes information about a name of an artist, a concert venue where the artist is to perform a concert, and a scheduled start time of the concert. In this example, the visitor 5 has made attendance application for a concert of an artist M1 and a concert of an artist M2.

In a case where the visitor 5 newly makes attendance application for another concert, the processor 12 adds the attendance application information IR of the concert to the historical data DH (FIG. 5) supplied from the server 30 to update the historical data DH. Thereafter, the processor 12 generates information to be recorded on the wristband 80 on the basis of the current time and the updated historical data DH. Specifically, in this example, the processor 12 generates the attendance history mark MN including the same number of star-shaped marks as the number of pieces of the attendance application information IR included in the updated historical data DH. Moreover, in a case where the updated historical data DH includes one piece of the attendance application information IR, the processor 12 generates the schedule information IS about a concert indicated by the attendance application information IR. Further, in a case where the updated historical data DH includes a plurality of pieces of the attendance application information IR, the processor 12 generates the schedule information IS about the first concert scheduled to start at a time after the current time of a plurality of concerts indicated by the plurality of pieces of the attendance application information IR. Furthermore, the processor 12 generates the message information IM including a message from an artist and a message from the operator of the music festival.

Moreover, the processor 12 also has a function of supplying the updated historical data DH to the server 30.

The writer 13 records information on the wristband 80. Specifically, the writer 13 irradiates the information recorder 83 of the wristband 80 with infrared light on the basis of a character pattern and a graphic pattern of information (such as a character and a graphic) desired to be recorded. In this example, the writer 13 records the attendance history mark MH, the schedule information IS, and the message information IM on the wristband 80. As a result, information illustrated in FIG. 2 is recorded on the wristband 80.

The shooting device 20 (FIG. 4A) is, for example, an device possessed by the operator of the musical festival, and shoots moving images of performance of the artist. In this example, the shooting device 20 is provided at each of the concert venues 101, 102, 103, and so on, as illustrated in FIG. 1. Thereafter, the shooting device 20 supplies the image data DT of shot concert images to the server 30.

The server 30 (FIGS. 4A and 4B) is, for example, an device possessed by the operator of the music festival, and provides various services to the visitor 5. The server 30 includes a history manager 31, a content manager 33, and a sales processor 35.

The history manager 31 manages the historical data DH of all visitors to the music festival. The history manager 31 includes the historical database 32. The historical database 32 includes accumulation of the historical data DH and the identification information IID corresponding to each other.

As illustrated in FIG. 4A, in a case where the identification information IID is supplied from the drawing device 10, the history manager 31 selects, on the basis of the supplied identification information IID, the historical data DH corresponding to the supplied identification information IID from the historical database 32, and supplies the selected historical data DH to the drawing device 10. Moreover, in a case where the updated historical data DH is supplied from the drawing device 10, the history manager 31 updates, on the basis of the updated historical data DH, the historical data DH corresponding to the updated identification information IID in the historical database 32.

Further, as illustrated in FIG. 4B, in a case where the identification information IID is supplied from the smartphone 40, the history manager 31 selects, on the basis of the supplied identification information IID, the historical data DH corresponding to the supplied identification information IID from the historical database 32, and supplies the historical data DH to the content manager 33.

Furthermore, the history manager 31 also has a function of analyzing the historical data DH of all the visitors to the music festival, for example. Specifically, the history manager 31 performs analysis of, for example, the number of visitors to the music festival and the number of attendees to each of concerts on the basis of the historical data DH of all the visitors. Thereafter, as illustrated in FIG. 4B, in a case where the identification information IID is supplied from the smartphone 40, the history manager 31 supplies a result of the analysis to the smartphone 40. On this occasion, in this example, the history manager 31 uses the historical data DH corresponding to the supplied identification information IID to determine, for example, ranking of the number of concerts the visitor 5 corresponding to the supplied identification information IID has attended, and supplies a result of the ranking to the smartphone 40. This makes it possible for the visitor 5 to know how many concerts the visitor 5 has attended, as compared with other visitors.

The content manager 33 manages content data. The content manager 33 includes a content database 34. The content database 34 includes accumulation of content data including the image data DT (concert images). Moreover, the content data includes, in addition to the image data DT, for example, video messages from the respective artists who perform a concert at the music festival, promotional music videos of the respective artists, etc. It is to be noted that the content data is not limited to such image data, and may include photograph data, text data, etc.

As illustrated in FIG. 4A, in a case where the image data DT is supplied from the shooting device 20, the content manager 33 accumulates the image data DT in the content database 34.

Moreover, as illustrated in FIG. 4B, in a case where the identification information IID is supplied from the smartphone 40, the content manager 33 selects, on the basis of the historical data DH supplied from the history manager 31 and corresponding to the supplied identification information IID, contents to be supplied to the visitor 5 from the content data in the content database 34. Specifically, the content manager 33 selects, for example, concert images related to a concert the visitor 5 has attended, a video message from an artist who has performed the concert, and a promotional music video of the artist, etc. Thereafter, the content manager 33 provides a list of selected contents to the smartphone 40, and supplies the content data to the smartphone 40 in response to a request from the smartphone 40.

As illustrated in FIG. 4B, the sales processor 35 performs processing of selling, for example, various kinds of goods, CDs (Compact Disc), and BDs (Blu-ray Disc (a registered trademark)) of respective artists who perform a concert at the music festival, and tickets of concerts scheduled to be performed by the respective artists, on the basis of the identification information IID supplied from the smartphone 40.

The smartphone 40 (FIG. 4B) is possessed by the visitor 5, and is operated by the visitor 5 in a case where the visitor 5 receives a service from the server 30. The smartphone 40 includes a reader 41 and a processor 42.

The reader 41 is a camera in this example, and reads the information code CD from the wristband 80.

The processor 42 performs communication with the server 30 on the basis of the information code CD to perform various kinds of processing. Specifically, the processor 42 extracts the website information IWS and the identification information IID from the information code CD read by the reader 41. Thereafter, the processor 42 accesses the server 30 on the basis of the website information IWS, and supplies the identification information IID to the server 30. Thus, the processor 42 performs processing to allow the visitor 5 to receive various kinds of services supplied from the server 30.

Thus, the visitor 5 using the smartphone 40 receives various services such as provision of various kinds of contents and sales of goods from the server 30. It is to be noted that in this example, the smartphone 40 is used; however, a tablet and a PC (Personal Computer), for example, may be used without being limited to the smartphone 40. Moreover, upon access to the server 30, the smartphone 40 may access the server 30 through wireless communication using a mobile phone network, a wireless LAN (Local Area Network), etc., or may access the server 30 through wired communication using a USB (Universal Serial Bus), a wired LAN, etc.

Herein, the drawing device 10 corresponds to a specific example of a "recording device" in the present disclosure. The wristband 80 corresponds to a specific example of a "recording medium" in the present disclosure. The writer 13 corresponds to a specific example of a "writer" in the present disclosure. The processor 12 corresponds to a specific example of a "generator" in the present disclosure. The reader 11 corresponds to a specific example of a "reader" in the present disclosure. The attendance history mark MH corresponds to a specific example of "history information" in the present disclosure. The server 30 corresponds to a specific example of a "information processing device" in the present disclosure. The smartphone 40 corresponds to a specific example of a "terminal device" in the present disclosure. The reader 41 corresponds to a specific example of a "terminal reader" in the present disclosure.

Operations and Workings

Next, description is given of operations and workings of the recording system 1 according to the present embodiment.

(Outline of Entire Operation)

First, an outline of an entire operation of the recording system 1 is described with reference to FIGS. 4A and 4B. The history manager 31 of the server 30 manages the historical data DH, and the content manager 33 manages the content data including the image data DT of concert images. Moreover, the sales processor 35 performs processing of selling various kinds of goods, CDs, and BDs of the respective artists and tickets of concerts scheduled to be performed by the respective artists. For the duration of the music festival, the drawing device 10 reads the information code CD from the wristband 80, and records the attendance history mark MH, the schedule information IS, and the message information IM on the wristband 80 on the basis of the historical data DH supplied from the history manager 31 of the server 30. The shooting device 20 shoots moving images of performance of the artists, and supplies the image data DT of the shot concert images to the server 30. Moreover, for the duration of the music festival and within a predetermined period after end of the music festival, the smartphone 40 reads the information code CD from the wristband 80 in accordance with an operation by the visitor 5, and accesses the server 30. Thereafter, the server 30 provides various services to the visitor 5 through the smartphone 40.

(Specific Operations)

Next, description is given of specific operations of the recording system 1. In the following, recording of information on the wristband 80, accumulation of the image data DT, and provision of a service by the server 30 are described in detail in this order.

(Recording of Information on Wristband 80)

FIG. 6 illustrates an operation of the recording system 1 in a case where the drawing device 10 records information on the wristband 80. In this example, the visitor 5 goes to a concert venue at which a concert the visitor 5 wants to attend is to be performed, and makes attendance application for the concert. Thereafter, for example, the visitor 5 holds the wristband 80 over the drawing device 10 at the concert venue, which causes the drawing device 10 to record information on the wristband 80. This operation is described in detail below.

First, the visitor 5 holds the wristband 80 over the drawing device 10, which causes the reader 11 of the drawing device 10 to read the information code CD from the wristband 80 (step S101).

Next, the processor 12 of the drawing device 10 extracts the identification information IID from the information code CD read in the step S101 (step S102), and transmits the identification information IID to the server 30 (step S103). The server 30 receives the identification information IID.

Next, the history manager 31 of the server 30 selects, on the basis of the identification information IID received in the step S103, the historical data DH corresponding to the received identification information IID from the historical database 32 (step S104), and transmits the selected historical data DH to the drawing device 10 (step S105). The drawing device 10 receives the historical data DH.

Next, the processor 12 of the drawing device 10 adds, to the historical data DH received in the step S105, the attendance application information IR of a concert for which attendance application is newly made to update the historical data DH, and generates, on the basis of the current time and the updated historical data DH, information (the attendance history mark MH, the schedule information IS, and the message information IM) to be recorded on the wristband 80 (step S106).

Specifically, for example, in a case where the historical data DH includes one piece of the attendance application information IR, the processor 12 generates, for example, the attendance history mark MH including one star-shaped mark. Moreover, the processor 12 generates the schedule information IS about the concert. Further, the processor 12 generates the message information IM including a message from an artist and a message from the operator of the music festival.

Moreover, for example, in a case where the historical data DH includes a plurality of pieces of the attendance application information IR, the processor 12 generates, for example, the attendance history mark MH including the same number of star-shaped marks as the number of pieces of the attendance application information IR. Further, the processor 12 generates the schedule information IS about the first concert scheduled to start at a time after the current time of a plurality of concerts for which attendance application has been made. Furthermore, the processor 12 generates the message information IM including the message from the artist and the message from the operation of the music festival.

Next, the writer 13 of the drawing device 10 records, on the wristband 80, the attendance history mark MH, the schedule information IS, and the message information IM generated in the step S106 (step S107).

Next, the processor 12 of the drawing device 10 transmits, to the server 30, the historical data DH updated in the step S106 together with the identification information IID (step S108). The server 30 receives the historical data DH and the identification information IID.

Thereafter, the history manager 31 of the server 30 updates, on the basis of the historical data DH and the identification information IID received in the step S108, the historical data DH corresponding to the received identification information IID in the historical database 32, and analyzes the historical data DH (step S109).

Thus, this sequence is completed.

In this example, the visitor 5 has made attendance application for the concert. Instead of this, the visitor 5 may hold the wristband 80 over the drawing device 10 without newly making attendance application. In this case, it is possible to update information recorded on the wristband 80. This operation is described below.

FIG. 7 illustrates an operation of the recording system 1 in a case where information recorded on the wristband 80 is updated without newly making attendance application. In this case, as with FIG. 6, the drawing device 10 reads the information code CD from the wristband 80 (step S101), and extracts the identification information IID from the information code CD and transmits the extracted identification information IID to the server 30 (steps S102 and S103). Thereafter, the server 30 selects the historical data DH on the basis of the identification information IID, and transmits the selected historical data DH to the drawing device 10 (steps S104 and S105).

Next, the processor 12 of the drawing device 10 generates information (the schedule information IS and the message information IM) to be recorded on the wristband 80 on the basis of the current time and the historical data DH received in the step S105 (step S116). In other words, in this case, the attendance history mark MH is not changed; therefore, the processor 12 does not generate the attendance history mark MH.

Thereafter, the writer 13 of the drawing device 10 records the schedule information IS and the message information IM generated in the step S116 on the wristband 80 (step S117).

Thus, this sequence is completed.

(Accumulation of Image Data DT)

FIG. 8 illustrates an operation of the recording system 1 in a case where the server 30 accumulates the image data DT in the content database 34. In this example, from start of a concert at each of the concert venues, the shooting device 20 shoots concert images on the basis of an operation by a camera operator. This operation is described in detail below.

First, the shooting device 20 shoots moving images of performance of an artist on the basis of the operation by the camera operator, for example (step S111). Thereafter, the shooting device 20 transmits the image data DT of shot concert images to the server 30 (step S112). The server 30 receives the image data DT.

Thereafter, the content manager 33 of the server 30 accumulates the image data DT received in the step S112 in the content database 34 (step S113).

Thus, this sequence is completed.

(Provision of Service by Server 30)

FIG. 9 illustrates an operation of the recording system 1 in a case where the visitor 5 receives a service from the server 30. In this example, the visitor 5 operates the smartphone 40 to access the server 30, and the server 30 provides various services to the visitor 5 through the smartphone 40. This operation is described in detail below.

First, the reader 41 of the smartphone 40 reads the information code CD from the wristband 80 on the basis of an operation by the visitor 5 (step S121).

Next, the processor 42 of the smartphone 40 extracts the website information IWS and the identification information IID from the information code CD read in the step S121 (step S122), and accesses the server 30 on the basis of the website information IWS, and transmits the identification information IID to the server 30 (step S123). The server 30 receives the identification information IID.

Next, the history manager 31 of the server 30 selects, on the basis of the identification information IID received in the step S123, the historical data DH corresponding to the received identification information IID from the historical database 32, and supplies the historical data DH to the content manager 33 (step S124). Thereafter, the content manager 33 of the server 30 selects, on the basis of the historical data DH supplied from the history manager 31, contents to be supplied to the visitor 5 from content data in the content database 34. Specifically, the content manager 33 selects, for example, concert images related to a concert the visitor 5 has attended, a video message from an artist who has performed the concert, a promotional music video of the artist, etc.

Next, the server 30 provides a service to the smartphone 40 (step S125). Specifically, the history manager 31 of the server 30 performs analysis of, for example, the number of visitors to the music festival and number of attendees to each of concerts on the basis of the history data DH of all the visitors to the music festival, and supplies a result of the analysis to the smartphone 40. On this occasion, the history manager 31 determines, for example, ranking of the number of concerts the visitor 5 has attended, and supplies a result of the ranking to the smartphone 40. Moreover, the content manager 33 of the server 30 provides a list of contents selected in the step S124 to the smartphone 40, and supplies content data to the smartphone 40 in response to a request from the smartphone 40. Further, the sales processor 35 sells various kinds of goods, CDs, and BDs of the respective artists who perform a concert at the music festival, and tickets of concerts scheduled to be performed by the respective artists.

Thereafter, the server 30 analyzes a history of access to the server 30 (step S126).

Thus, this sequence is completed.

As described above, in the recording system 1, the schedule information IS corresponding to the current time and the historical data DH is recorded on the wristband 80. In particular, in a case where the historical data DH indicates attendance application for a plurality of concerts, the recording system 1 records the schedule information IS about the first concert scheduled to start at a time after the current time of the plurality of concerts. Accordingly, for example, a concert the visitor 5 is attending ends, and, for example, the visitor 5 holds the wristband 80 over the drawing device 10, which causes the schedule information IS to be rewritten to the schedule information IS about the next concert the visitor 5 is scheduled to attend. In the recording system 1, a schedule is rewritten in accordance with the time in such a manner, which makes it possible for the visitor 5 to easily check his future schedule through watching the wristband 80 mounted around his wrist.

In other words, for example, in a case where the operator of the music festival distributes a paper on which a timetable of concerts is printed, the visitor 5 involves effort to find necessary information from the timetable. Moreover, for example, in a case where the operator of the music festival posts the timetable of concerts on a website, the visitor 5 involves effort to access the website. In the recording system 1, it is possible for the visitor 5 to easily check information about the next concert the visitor 5 himself is scheduled to attend through watching the wristband 80 mounted around his wrist. This makes it possible to enhance user convenience in the recording system 1.

Moreover, in the recording system 1, the attendance history mark MH is recorded on the wristband 80. This makes it possible for the visitor 5 to intuitively perceive the degree of attendance to the concerts and obtain a feeling of satisfaction. Further, it is possible also for people (visitors) around the visitor 5 to know the degree of attendance of the visitor 5 to concerts, which may create an opportunity to have communication between visitors. As a result, it is possible for the visitor 5 to enjoy the music festival more.

Further, in the recording system 1, the message information IM is recorded on the wristband 80, which makes it possible to reliably inform messages from the artists and the operator of the music festival to the visitor 5. For example, in a case where the scheduled start time of a concert is changed or a concert venue is changed, recording on the wristband 80 in addition to dissemination via broadcasting makes it possible to more reliably inform change in schedule to the visitor 5.

Furthermore, in the recording system 1, the information code CD is recorded on the wristband 80, which makes it possible for an electronic device such as the drawing device 10 and the smartphone 40 to perform processing on the basis of the information code CD. This makes it possible to enhance user convenience. In this example, the identification information IID and the website information IWS are recorded on the information code CD. This makes it possible to specify the historical data DH corresponding to the wristband 80 with use of the identification information IID in the recording system 1, and makes it possible to perform various kinds of processing on the basis of the historical data DH. Moreover, in the recording system 1, the smartphone 40 is allowed to easily access the server 30 with use of the website information IWS, which makes it possible for the visitor 5 to receive provision of various services corresponding to the historical data DH.

For example, in the recording system 1, contents to be provided to the visitor 5 are selected from the content data in the content database 34 on the basis of the historical data DH. Specifically, for example, concert images related to a concert the visitor 5 has attended, a video message from an artist who has performed the concert, and a promotional music video of the artist, etc. are selected. Hence, in the recording system 1, information about an artist in which the visitor 5 is interested is selected, and is provided to the visitor 5, which makes it possible to enhance user convenience.

Effects

As described above, in the present embodiment, schedule information corresponding to the current time and historical data is recorded on the wristband, which makes it possible to enhance user convenience.

Modification Example 1-1

In the foregoing embodiment, the server 30 manages the historical data DH, but the embodiment is not limited thereto. Alternatively, for example, the historical data may be recorded on the information code CD of a wristband. A recording system 1B according to the present modification example is described in detail below.

FIGS. 10A and 10B illustrate a configuration example of the recording system 1B according to the present modification example. The historical data DH and the website information IWS are recorded on the information code CD of a wristband 80B according to the present modification example. In other words, while in the foregoing embodiment, the identification information IID and the website information IWS are recorded on the information code CD, in the present modification example, the historical data DH and the website information IWS are recorded on the information code CD. The recording system 1B includes a drawing device 10B, the shooting device 20, a server 30B, and a smartphone 40B.

The drawing device 10B (FIG. 10A) includes a processor 12B. The processor 12B generates information (the attendance history mark MH, the schedule information IS, the message information IM, and the information code CD) to be recorded on the wristband 80B on the basis of the information code CD. Specifically, the processor 12B extracts the historical data DH from the information code CD read by the reader 11, and generates information to be recorded on the wristband 80B on the basis of the extracted historical data DH. In other words, in the foregoing embodiment, the processor 12 obtains the historical data DH from the server 30 on the basis of the identification information IID included in the information code CD. In contrast, in the present modification example, the processor 12B directly obtains the historical data DH from the information code CD.

For example, in a case where the visitor 5 newly makes attendance application for another concert, the processor 12B adds attendance application information IR of the concert to the historical data DH to update the historical data DH. Thereafter, the processor 12B generates information to be recorded on the wristband 80B on the basis of the current time and the updated historical data DH, as with the processor 12 according to the foregoing embodiment.

Moreover, the processor 12B also has a function of supplying, to the server 30B, processing data DP indicating contents processed by the processor 12B. In this example, the processing data DP includes information indicating that attendance application for a concert of an artist M3 has been made.

Thereafter, the writer 13 records the attendance history mark MH, the schedule information IS, the message information IM, and the information code CD on the wristband 80B.

The server 30B (FIGS. 10A and 10B) provides various services to the visitor 5. The server 30B includes an analyzer 31B. The analyzer 31B accumulates the processing data DP supplied from the drawing device 10B and analyzes the processing data DP. Specifically, the analyzer 31B performs analysis of, for example, the number of visitors to the musical festival and the number of attendees to each of concerts on the basis of the accumulated processing data DP. Thereafter, as illustrated in FIG. 10B, in a case where the historical data DH is supplied from the smartphone 40B, the analyzer 31B supplies a result of the analysis to the smartphone 40B. On this occasion, the analyzer 31B may determine, for example, ranking of the number of concerts the visitor 5 has attended, and may supply a result of the ranking to the smartphone 40B.

The smartphone 40B (FIG. 10B) includes a processor 42B. The processor 42B performs communication with the server 30B on the basis of the information code CD to perform various kinds of processing. Specifically, the processor 42B extracts the website information IWS and the historical data DH from the information code CD read by the reader 41. Thereafter, the processor 42B accesses the server 30B on the basis of the website information IWS, and supplies the historical data DH to the server 30B. Thereafter, the processor 42B performs processing to allow the visitor 5 to receive various kinds of services provided from the server 30B.

(Recording of Information on Wristband 80B)

FIG. 11 illustrates an operation of the recording system 1B in a case where the visitor 5 makes attendance application for a concert and the drawing device 10B records information on the wristband 80B.

First, the visitor 5 holds the wristband 80B over the drawing device 10B, which causes the reader 11 of the drawing device 10B to read the information code CD from the wristband 80B (step S131).

Next, the processor 12B of the drawing device 10B extracts the historical data DH from the information code CD read in the step S131 (step S132). Thereafter, the processor 12B adds, to the extracted historical data DH, the attendance application information IR of a concert for which attendance application is newly made to update the historical data DH, and generates, on the basis of the current time and the updated historical data DH, information (the attendance history mark MH, the schedule information IS, the message information IM, and the information code CD) to be recorded on the wristband 80B (step S136).

Next, the writer 13 of the drawing device 10B records, on the wristband 80B, the attendance history mark MH, the schedule information IS, the message information IM, and the information code CD generated in the step S136 (step S137).

Next, the processor 12B of the drawing device 10B transmits, to the server 30B, the processing data DP indicating that data about attendance application for the concert is added in the step S136 (step S138). The server 30B receives the processing data DP.

Next, the analyzer 31B of the server 30B accumulates the processing data DP received in the step S138, and analyzes the processing data DP (step S139).

FIG. 12 illustrates an operation of the recording system 1B in a case where information recorded on the wristband 80B is updated without newly making attendance application. In this case, as with FIG. 11, the drawing device 10B reads the information code CD from the wristband 80B (step S131), and extracts the historical data IID from the information code CD (step S132).

Next, the processor 12B of the drawing device 10B generates, on the basis of the current time and the historical data DH extracted in the step S132, information (the schedule information IS and the message information IM) to be recorded on the wristband 80B (step S135). In other words, in this case, the attendance history mark MH and the information code CD (the historical data DH) are not changed; therefore, the processor 12 does not generate the attendance history mark MH and the information code CD.

Thereafter, the writer 13 of the drawing device 10 records, on the wristband 80B, the schedule information IS and the message information IM generated in the step S135 (step S137).

(Provision of Service by Server 30B)

FIG. 13 illustrates an operation of the recording system 1B in a case where the visitor 5 receives a service from the server 30B.

First, the reader 41 of the smartphone 40B reads the information code CD from the wristband 80B on the basis of an operation by the visitor 5 (step S141).

Next, the processor 42B of the smartphone 40B extracts the website information IWS and the historical data DH from the information code CD read in the step S141 (step S142), and accesses the server 30B on the basis of the website information IWS, and transmits the historical data DH to the server 30B (step S143). The server 30B receives the historical data DH.

Next, the content manager 33 of the server 30B selects contents to be provided to the visitor 5 from content data in the content database 34 on the basis of the historical data DH received in the step S143 (step S144).

Thereafter, the server 30B provides a service to the smartphone 40B (step S145), and analyzes a history of access to the server 30B (step S146).

Modification Example 1-2

In the foregoing embodiment, the information recorder 83 (FIG. 3) of the wristband includes three recording layers 92, 94, and 96, but is not limited thereto. The information recorder 83 may include two or less recording layers, or may include four or more recording layers.

Modification Example 1-3

In the foregoing embodiment, one server 30 is provided, and the server 30 includes the history manager 31, the content manager 33, and the sales processor 35, but the embodiment is not limited thereto. Alternatively, for example, a plurality of servers may be provided. For example, a server including the history manager 31, a server including the content manager 33, and a server including the sales processor 35 may be provided.

Other Modification Examples

In the foregoing embodiment, the present technology is applied to the music festival, but is not limited thereto. For example, the present technology is applicable to, for example, various events such as an exhibition and a workshop. In the following, description is given of a case where the present technology is applied to an exhibition. A venue of the exhibition includes a plurality of seminar venues in addition to exhibition booths, and a visitor is allowed to attend a seminar to be held at each of the seminar venues. The visitor receives a wristband at a reception of the venue of the exhibition. The visitor goes to a seminar venue the visitor wants to attend, and pays an attendance fee for the seminar, and a drawing device at the seminar venue records information on the wristband. At each of the seminar venues, a shooting device shoots moving images of a lecture by a seminar presenter, and supplies the shot images to a server. Accordingly, various images are accumulated on the server. The visitor uses the information code CD recorded on the wristband for a duration of the exhibition and within a predetermined period after end of the exhibition, which allows the visitor to access the server through use of, for example, a smartphone. This allows the visitor to obtain, with or without charge, images related to a seminar the visitor himself has attended, for example. Moreover, access to the server allows the visitor to receive various services such as sales of books related to the contents of the seminar.

2. Second Embodiment

Next, description is given of a recording system 2 according to a second embodiment. It is to be noted that substantially same components as those of the recording system 1 according to the foregoing first embodiment are denoted by same reference numerals, and description thereof is omitted where appropriate.

FIG. 14 illustrates an example of an amusement park 200 to which the recording system 2 according to the second embodiment is applied. The amusement park 200 includes a plurality of attractions 201, 202, and so on. In the amusement park 200, in order to shorten waiting time for an attraction, each visitor 5 is allowed to make a predetermined number of riding reservations for attractions, for example.

At the amusement park 200, the visitor 5 receives a wristband 180 at an entrance gate 209. Thereafter, in a case where the visitor 5 makes a riding reservation for an attraction, the visitor 5 holds the wristband 180 over a drawing device 110 located at a riding reservation spot for the attraction. Moreover, in a case where the visitor 5 rides the attraction, the visitor holds the wristband 180 over the drawing device 110 located at an entrance to the attraction. The drawing device 110 thereby records information on the wristband 180. At each of the attractions, a shooting device 120 shoots a photograph of the visitor 5 while the visitor 5 is waiting to ride the attraction or is riding the attraction, and supplies shot photograph data DT2 to the server 130. In a case where the visitor 5 wants to buy the photograph, the visitor 5 goes to a photograph sales spot 211, and holds the wristband 180 over a printer device 150. The printer device 150 thereby prints the photograph on the basis of an operation by the visitor 5.

The visitor 5 uses the information code CD recorded on the wristband 180, which allows the visitor 5 to access the server 130 with use of a smartphone 140, for example. This allows the visitor 5 to make a reservation for, for example, a restaurant, for example, in the amusement park 200 through accessing the server 130. Moreover, the visitor 5 is allowed to receive various services such as sales of the photograph data DT and sales of goods related to the amusement park 200 through accessing the server 130 within a predetermined period after a date of visit to the amusement park 200.

FIG. 15 illustrates a configuration example of the wristband 180. The wristband 180 includes an information recorder 183. A riding history mark MH2, the schedule information IS (schedule information IS1 to IS3), and the information code CD are recorded on the information recorder 183.

The riding history mark MH2 indicates the number of attractions the visitor 5 wearing the wristband 180 has ridden in the amusement park 200. In this example, the more attractions the visitor rides, the more star-shaped marks are recorded as the riding history mark MH2. It is to be noted that the riding history mark MH2 is not limited thereto, and a color of the mark may be changed depending on the number of attractions the visitor 5 has ridden.

In this example, the schedule information IS indicates a future schedule of the visitor 5. In this example, information about first three events scheduled after the current time of all events including an event reserved by the visitor 5 and an event to be held in the amusement park 200 is recorded as three pieces of schedule information IS1 to IS3. Specifically, in this example, a name of an attraction (an attraction 201) for which the visitor 5 has made a riding reservation and a scheduled riding time of the attraction are recorded as the schedule information IS1. Moreover, an event in the park such as a parade and a scheduled start time of the event are recorded as the schedule information IS2. Further, a restaurant for which the visitor 5 has made an advance reservation and a scheduled mealtime are recorded as the schedule information IS3.

The identification information IID for identification of the wristband 180 and the website information IWS for access to the server 130 are recorded on the information code CD.

FIGS. 16A and 16B illustrate a configuration example of the recording system 2. The recording system 2 includes the drawing device 110, the shooting device 120, the printer device 150, the smartphone 140, and the server 130. It is to be noted that it is possible for the recording system 2 to include a plurality of drawing devices 110 and a plurality of shooting devices 120, as illustrated in FIG. 14; however, FIG. 16A illustrates only one drawing device 110 and one shooting device 120 provided at the attraction 201 for convenience of description.

The drawing device 110 (FIG. 16A) is, for example, a device possessed by an operator of the amusement park 200, and reads the information code CD from the wristband 180 and records information on the wristband 180. The drawing device 110 is provided at each of the attractions 201, 202, and so on in this example, as illustrated in FIG. 14. The drawing device 110 includes a reader 111, an event storage unit 114, a processor 112, and a writer 113.

The reader 111 reads the information code CD from the wristband 180 as with the reader 11 according to the foregoing first embodiment.

The event storage unit 114 holds event schedule data DE indicating a schedule of events scheduled at the current day in the amusement park 200.

FIG. 17 illustrates an example of the event schedule data DE. In this example, the event schedule data DE includes names of events to be held in the amusement park 200 and places and scheduled times at which the events are to be held.

The processor 112 generates information (the riding history mark MH2 and the schedule information IS) to be recorded on the wristband 180 on the basis of the information code CD. Specifically, the processor 112 first extracts the identification information IID from the information code CD read by the reader 11, and supplies the extracted identification information IID to the server 130. Thereafter, the processor 112 generates information to be recorded on the wristband 180 on the basis of the event schedule data DE stored in the event storage unit 114 and the historical data DH supplied from the server 130 and corresponding to the identification information IID.

FIG. 18 illustrates an example of the historical data DH. In this example, the historical data DH includes information about contents of processing, a place to be subjected to processing, a processing time, and a scheduled time. In this example, the visitor 5 has made a riding reservation for the attraction 201 at 8:30. A scheduled riding time of the attraction 201 is "from 9:50 to 10:50". Moreover, in this example, the visitor 5 has made a reservation for the restaurant 221 at "9:00". The scheduled mealtime at the restaurant 221 is "12:00". Further, in this example, the visitor 5 rode the attraction 202 at 9:10.

For example, in a case where the visitor 5 rides another attraction 203, the processor 112 adds data indicating riding of the attraction 203 to the historical data DH (FIG. 18) supplied from the server 130 to update the historical data DH. Thereafter, the processor 112 generates information to be recorded on the wristband 180 on the basis of the current time, the event schedule data DE, and the updated historical data DH. Specifically, for example, the processor 112 generates the riding history mark MH2 including the same number of star-shaped marks as the number of ridden attractions on the basis of the historical data DH. Moreover, in this example, the processor 112 generates the schedule information IS on the basis of information about first three events scheduled after the current time of all events that are included in the event schedule data DE and the history data DH and include an event reserved by the visitor 5 and an event to be held in the amusement park 200.

Moreover, the processor 112 also has a function of supplying the updated historical data DH to the server 130, as with the processor 12 according to the foregoing first embodiment.

The writer 113 records information on the wristband 180, as with the writer 13 according to the foregoing first embodiment.

The shooting device 120 (FIG. 16A) is, for example, an device possessed by the operator of the amusement park 200, and shoots a photograph of the visitor 5. In this example, the shooting device 120 is provided at each of the attractions 201, 201, and so on, as illustrated in FIG. 14. The shooting device 120 includes a reader 121, a shooting unit 122, and a processor 123.

The reader 121 reads the information code CD from the wristband 180, as with the reader 11 according to the foregoing first embodiment.

The shooting unit 122 shoots a photograph of the visitor 5 while the visitor 5 is waiting to ride an attraction or is riding the attraction, and generates photograph data DT2.

The processor 123 supplies the photograph data DT2 to the server 130. Specifically, the processor 123 extracts the identification information IID from the information code CD read by the reader 121, and supplies, to the server 130, the photograph data DT2 generated by the shooting unit 122 together with the identification information IID.

The printer device 150 (FIG. 16A) is, for example, a device possessed by the operation of the amusement park 200, and prints the photograph shot by the shooting device 120 in a case where the visitor 5 buys the photograph. In this example, the printer device 150 is provided at the photograph sales spot 211, as illustrated in FIG. 14. The printer device 150 includes a reader 151, a processor 152, and a printer 153.

The reader 151 reads the information code CD from the wristband 180, as with the reader 11 according to the foregoing first embodiment.

The processor 152 obtains the photograph data DT2 related to the visitor 5 from the server 130 on the basis of the information code CD. Specifically, the processor 152 extracts the identification information IID from the information code CD read by the reader 151, and supplies the extracted identification information IID to the server 130, and obtain, from the server 130, the photograph data DT2 corresponding to the supplied identification information IID. Moreover, the processor 152 also has a function of editing the photograph data DT2. Specifically, for example, it is possible for the processor 152 to perform color correction, trimming, addition of a photo frame, etc. in accordance with an operation by the visitor 5.

The printer 153 performs printing on a photo paper on the basis of the photograph data DT2. The photo paper may be a typical photo paper, or a photo paper having an adhesive back surface.

The smartphone 140 (FIGS. 16A and 16B) is possessed by the visitor 5, and is operated by the visitor 5 in a case where the visitor 5 makes a reservation for a restaurant or receives a service such as sales of photographs and goods. The smartphone 140 includes a reader 141 and a processor 142.

The reader 141 reads the information code CD from the wristband 180, as with the reader 41 according to the foregoing first embodiment.

The processor 142 performs communication with the server 130 on the basis of the information code CD to perform various kinds of processing. Specifically, the processor 142 extracts the website information IWS and the identification information IID from the information code CD read by the reader 141. Thereafter, the processor 142 accesses the server 130 on the basis of the website information IWS, and supplies the identification information IID to the server 130. Thus, the processor 142 performs processing to allow the visitor 5 to receive various kinds of services such as reservation for a restaurant, sales of photographs and goods supplied from the server 130.

The server 130 (FIGS. 16A and 16B) is, for example, an device possessed by the operator of the amusement park 200, and provides various services to the visitor 5. The server 130 includes a history manager 131, a photograph manager 133, a sales processor 135, and a restaurant reservation processor 136.

The history manager 131 manages the historical data DH of all visitors to the amusement park 200. The history manager 131 includes historical database 132. The historical database 132 includes accumulation of the historical data DH and the identification information IID corresponding to each other.

As illustrated in FIG. 16A, in a case where the identification information IID is supplied from the drawing device 110, the history manager 131 selects the historical data DH corresponding to the supplied identification information IID from the historical database 132 on the basis of the supplied identification information IID, and supplies the selected historical data DH to the drawing device 110. Moreover, in a case where the updated historical data DH is supplied from the drawing device 110, the history manager 131 updates, on the basis of the updated historical data HD, the historical data DH corresponding to the supplied identification information IID in the historical database 132.

Moreover, as illustrated in FIG. 16A, in a case where the identification information IID is supplied from the smartphone 140, the history manager 131 selects, on the basis of the supplied identification information IID, the historical data DH corresponding to the supplied identification information IID from the historical database 132, and supplies the selected historical data DH to the restaurant reservation processor 136. Further, in a case where the updated historical data DH is supplied from the restaurant reservation processor 136, the history manager 131 updates, on the basis of the updated historical data DH, the historical data DH corresponding to the supplied identification information IID in the historical database 132.

Moreover, the history manager 131 also has a function of analyzing the historical data DH of all the visitors to the amusement park 200, for example. Specifically, the history manager 131 performs analysis of, for example, the number of visitors to the amusement park 200 per day and the number of passengers on each of attractions on the basis of the historical data DH of all the visitors. Thereafter, as illustrated in FIG. 16B, in a case where the identification information IID is supplied from the smartphone 140, the history manager 131 supplies a result of the analysis to the smartphone 140. On this occasion, in this example, the history manager 131 supplies, to the smartphone 140, information about what number visitor to the amusement park 200 the visitor 5 is, information about what number passenger on an attraction the visitor 5 is, etc. with use of the historical data DH corresponding to the identification information IID. Further, the history manager 131 may supply, to the smartphone 140, information about weather of a day of visit to the amusement park 200 by the visitor 5, news of the day, etc.

The photograph manager 133 manages the photograph data DT2. The photograph manager 133 includes a photograph database 134. The photograph database 134 includes accumulation of the photograph data DT2 and the identification information IID corresponding to each other.

As illustrated in FIG. 16A, in a case where the photograph data DT2 and the identification information IID are supplied from the shooting device 120, the photograph manager 133 accumulates the photograph data DT2 and the identification information IID corresponding to each other in the photograph database 134. Moreover, in a case where the identification information IID is supplied from the printer device 150, the photograph manager 133 selects, on the basis of the supplied identification information IID, the photograph data DT2 corresponding to the supplied identification information IID from the photograph database 134, and supplies the selected photograph data DT2 to the printer device 150.

Further, as illustrated in FIG. 16B, in a case where the identification information IID is supplied from the smartphone 140, the photograph manager 133 selects, on the basis of the supplied identification information IID, the photograph data DT2 corresponding to the supplied identification information IID from the photograph database 134. Thereafter, the photograph manager 133 provides a list of photograph data DT2 (thumbnails) to the smartphone 140, and supplies the photograph data DT2 to the smartphone 140 in accordance with a request from the smartphone 140.

As illustrated in FIG. 16B, the sales processor 135 performs processing of selling, for example, various kinds of goods, etc. of the amusement park 200 on the basis of the identification information IID supplied from the smartphone 140.

The restaurant reservation processor 136 performs processing of making a reservation for a restaurant in the amusement park 200. Specifically, as illustrated in FIG. 16A, in a case where the identification information IID is supplied from the smartphone 140, the restaurant reservation processor 136 provides, for example, a list of restaurants in the amusement park 200 and information about the respective restaurants to the smartphone 140, and performs processing of making a reservation for a restaurant in accordance with a request from the smartphone 140. Thereafter, the restaurant reservation processor 136 adds data indicating the processing of making the reservation to the historical data DH supplied from the history manager 131 and corresponding to the identification information IID to update the historical data DH, and supplies the updated historical data DH to the history manager 131.

Herein, the drawing device 110 corresponds to a specific example of a "recording device" in the present disclosure. The event schedule data DE corresponds to a specific example of "predetermined schedule data" in the present disclosure. The riding history mark MH2 corresponds to a specific example of "history information" in the present disclosure. The server 130 corresponds to a specific example of a "information processing device" in the present disclosure. The smartphone 140 corresponds to a specific example of a "terminal device" in the present disclosure.

(Recording of Information on Wristband 180)

FIG. 19 illustrates an operation of the recording system 2 in a case where the drawing device 110 records information on the wristband 180. In this example, upon riding an attraction, the visitor 5 holds the wristband 180 over the drawing device 110 at an entrance of the attraction, which causes the drawing device 110 to record information on the wristband 180. It is to be noted that in this example, a case of riding the attraction is described as an example; however, a similar operation is performed in a case of making a reservation for riding an attraction. That is, in this case, the visitor 5 holds the wristband 180 over the drawing device 110 at a riding reservation spot for the attraction, which causes the drawing device 110 to record information on the wristband 180. This operation is described in detail below.

First, the visitor 5 holds the wristband 180 over the drawing device 110, which causes the reader 111 of the drawing device 110 to read the information code CD from the wristband 180 (step S201).

Next, the processor 112 of the drawing device 110 extracts the identification information IID from the information code CD read in the step S201 (step S202), and transmits the extracted identification information IID to the server 130 (step S203). The server 130 receives the identification information IID.

Next, the history manager 131 of the server 130 selects, on the basis of the identification information IID received in the step S203, the historical data DH corresponding to the received identification information IID from the historical database 132 (step S204), and transmits the selected historical data DH to the drawing device 110 (step S205). The drawing device 110 receives the historical data DH.

Next, the processor 112 of the drawing device 110 adds data about riding of the attraction to the historical data DH received in the step S205 to update the historical data DH, and generates information (the riding history mark MH2 and the schedule information IS) to be recorded on the wristband 180 on the basis of the current time, the updated historical data DH, and the event schedule data DE stored in the event storage unit 114 (step S206). Specifically, the processor 112 generates the riding history mark MH2 including the same number of star-shaped marks as the number of ridden attractions on the basis of the historical data DH. Moreover, in this example, the processor 112 generates the schedule information IS on the basis of information about first three events scheduled after the current time of all events that are included in the event schedule data DE and the historical data DH and include an event reserved by the visitor 5 and an event to be held in the amusement park 200. It is to be noted that in a case where a reservation for riding an attraction is made, the riding history mark MH2 is not changed; therefore, generation of the riding history mark MH2 may be omitted.

Next, the writer 113 of the drawing device 110 records, on the wristband 180, the riding history mark MH2 and the schedule information IS generated in the step S206 (step S207). It is to be noted that in a case where a reservation for riding an attraction is made, the riding history mark MH2 is not changed; therefore, recording of the riding history mark MH2 on the wristband 180 may be omitted.

Next, the processor 112 of the drawing device 110 transmits, to the server 130, the historical data DH updated in the step S206 together with the identification information IID (step S208). The server 130 receives the historical data DH and the identification information IID.

Thereafter, the history manager 131 of the server 130 updates, on the basis of the historical data DH and the identification information IID received in the step S208, the historical data DH corresponding to the received identification information IID in the historical database 132, and analyzes the historical data DH (step S209).

Thus, this sequence is completed.

FIG. 20 illustrates an operation of the recording system 2 in a case where information recorded on the wristband 180 is updated without riding, reservation for riding, etc. In this case, the drawing device 110 reads the information code CD from the wristband 180 as with FIG. 19 (step S201), and extracts the identification information IID from the information code CD and transmits the extracted identification information IID to the server 130 (steps S202 and S203). Thereafter, the server 130 selects the historical data DH on the basis of the identification information IID, and transmits the selected historical data DH to the drawing device 110 (steps S204 and S205).

Next, the processor 112 of the drawing device 110 generates information (the schedule information IS) to be recorded on the wristband 180 on the basis of the current time, the historical data DH received in the step S205, and the event schedule data DE stored in the event storage unit 114 (step S216). In other words, in this case, the riding history mark MH2 is not changed; therefore, the processor 112 does not generate the riding history mark MH2.

Thereafter, the writer 113 of the drawing device 110 records the schedule information IS generated in the step S216 on the wristband 180 (step S217).

Thus, this sequence is completed.

(Accumulation of Photograph Data DT2)

FIG. 21 illustrates an operation of the recording system 2 in a case where the server 130 accumulates the photograph data DT2 in the photograph database 134. In this example, at each of the attractions, the shooting device 120 shoots a photograph of the visitor 5 while the visitor is waiting to ride the attraction or is riding the attraction. This operation is described in detail below.

First, the visitor 5 holds the wristband 180 over the reader 121 of the shooting device 120, which causes the reader 121 to read the information code CD from the wristband 180 (step S211).

Next, the processor 123 of the shooting device 120 extracts the identification information IID from the information code CD read in the step S211 (step S212). Thereafter, the shooting unit 122 of the shooting device 120 shoots a photograph of the visitor 5 while the visitor 5 is waiting to ride the attraction or is riding the attraction (step S213). Thereafter, the processor 123 of the shooting device 120 transmits, to the server 130, the photograph data DT2 of the shot photograph together with the identification information IID (step S214). The server 130 receives the photograph data DT2.

Thereafter, the photograph manager 133 of the server 130 accumulates the photograph data DT2 and the identification information IID, which are received in the step S214, corresponding to each other in the photograph database 134 (step S215).

Thus, this sequence is completed. It is to be noted that in this example, the shooting device 120 does not record information on the wristband 180; however, the shooting device 120 is not limited thereto. Alternatively, the shooting device 120 may include, for example, an event storage unit and a writer as with the drawing device 110 (FIG. 16A), and may record information on the wristband 180 as with an example illustrated in FIG. 20.

(Printing of Photograph Data DT2)

FIG. 22 illustrates an operation of the recording system 2 in a case where the printer device 150 prints a photograph. In this example, the visitor 5 goes to the photograph sales spot 211 and holds the wristband 180 over the printer device 150, which causes the printer device 150 to print a photograph in accordance with an operation by the visitor 5. This operation is described in detail below.

First, the visitor 5 holds the wristband 180 over the reader 151 of the printer device 150, which causes the reader 151 to read the information code CD from the wristband 180 (step S221).

Next, the processor 152 of the printer device 150 extracts the identification information IID from the information code CD read in the step S221 (step S222), and transmits the extracted identification information IID to the server 130 (step S223). The server 130 receives the identification information IID.

Next, the photograph manager 133 of the server 130 selects, on the basis of the identification information IID received in the step S223, the photograph data DT2 corresponding to the received identification information IID from the photograph database 134 (step S224), and transmits the selected photograph data DT2 to the printer device 150 (step S225). The printer device 150 receives the photograph data DT2.

Thereafter, the printer 153 of the printer device 150 performs printing on the basis of the photograph data DT2 (step S226). On this occasion, the processor 152 of the printer device 150 edits the photograph data DT2 on the basis of an operation by the visitor 5 as necessary. Thereafter, the printer 153 performs printing on a photo paper on the basis of the photograph data DT2.

Thus, this sequence is completed. It is to be noted that in this example, the printer device 150 does not record information on the wristband 180, but is not limited thereto. Alternatively, for example, the printer device 150 may include an event storage unit and a writer, as with the drawing device 110 (FIG. 16A), and may record information on the wristband 180 as with the example illustrated in FIG. 20.

(Reservation for Restaurant)

FIG. 23 illustrates an operation of the recording system 2 in a case where a reservation for a restaurant is made. In this example, the visitor 5 operates the smartphone 140 in the amusement park 200 to access the server 130 and make a reservation for a restaurant. This operation is described in detail below.

First, the reader 141 of the smartphone 140 reads the information code CD from the wristband 180 on the basis of an operation by the visitor 5 (step S231).

Next, the processor 142 of the smartphone 140 extracts the website information IWS and the identification information IID from the information code CD read in the step S231 (step S232), and accesses the server 130 on the basis of the website information IWS, and transmits the identification information IID to the server 130 (step S233). The server 130 receives the identification information IID.

Next, the history manager 131 of the server 130 selects, on the basis of identification information IID received in the step S233, the historical data DH corresponding to the identification information IID from the historical database 132 (step S234).

Next, the restaurant reservation processor 136 of the server 130 transmits a list of restaurants in the amusement park 200 and information about the respective restaurants to the smartphone 140 (step S235). The smartphone 140 receives information related to these restaurants. The visitor 5 browses the information about the respective restaurants and decides a restaurant where the visitor 5 wants to have a meal and a scheduled mealtime.

Next, the processor 142 of the smartphone 140 provides, to the server 130, an instruction for a reservation for the restaurant on the basis of an operation by the visitor 5 (step S236). The server 130 receives the instruction for the reservation.

Thereafter, the restaurant reservation processor 136 of the server 130 performs processing of making a reservation for the restaurant on the basis of the instruction for the reservation received in the step S236, and adds data indicating the processing of making the reservation to the historical data DH selected in the step S234 to update the historical data DH (step S237). Thereafter, the history manager 131 updates, on the basis of the updated historical data DH and the identification information IID, the historical data DH corresponding to the identification information IID in the historical database 132.

Thus, this sequence is completed.

(Provision of Service by Server 130)

FIG. 24 illustrates an operation of the recording system 2 in a case where the visitor 5 receives a service from the server 130. In this example, the visitor 5 operates the smartphone 140 to access the server 130, and the server 130 provides various services to the visitor 5 through the smartphone 140. This operation is described in detail below.

First, the reader 141 of the smartphone 140 reads the information code CD from the wristband 180 on the basis of an operation by the visitor 5 (step S241).

Next, the processor 142 of the smartphone 140 extracts the website information IWS and the identification information IID from the information code CD read in the step S241 (step S242), and accesses the server 130 on the basis of the website information IWS, and transmits the identification information IID to the server 130 (step S243). The server 130 receives the identification information IID.

Next, the photograph manager 133 of the server 130 selects, on the basis of the identification information IID received in the step S243, the photograph data DT2 corresponding to the received identification information IID from the photograph database 134 (step S244).

Next, the server 130 provides a service to the smartphone 140 (step S245). Specifically, the history manager 131 of the server 130 performs analysis of, for example, the number of visitors to the amusement park 200 per day and the number of passengers on each of attractions on the basis of the historical data DH of all the visitors, and supplies a result of the analysis to the smartphone 40. On this occasion, for example, the history manager 131 supplies, to the smartphone 140, information about what number visitor to the amusement park 200 the visitor 5 is, information about what number passenger on an attraction the visitor 5 is, etc. Moreover, the photograph manager 133 of the server 130 provides a list of photograph data DT2 (thumbnails) selected in the step S244 to the smartphone 140, and supplies the photograph data DT2 to the smartphone 140 in accordance with a request from the smartphone 140. Further, the sales processor 135 sells various kinds of goods of the amusement park 200, etc.

Thereafter, the server 130 performs analysis of a history of access to the server 130 (step S246).

Thus, this sequence is completed.

As described above, in the recording system 2, the information code CD of the wristband 80 is used for various applications, which makes it possible to enhance user convenience.

For example, the recording system 2 manages the photograph data DT2 corresponding to the identification information IID, and specifies, on the basis of the information code CD, the photograph data DT2 related to the visitor 5 corresponding to the information code CD (the identification information IID). Accordingly, in the recording system 2, the visitor 5 saves an effort to select a photograph of the visitor 5 himself from a plurality of photographs, which makes it possible to enhance user convenience.

Moreover, for example, in the recording system 2, a reservation for a restaurant is made on the basis of the information code CD, which allows the visitor 5 to save an effort to input a name, etc. of the visitor 5. This make it possible to enhance user convenience.

As described above, in the present embodiment, the information code is used for more various applications, which makes it possible to enhance user convenience.

Modification Example 2

Each of the modification examples of the foregoing first embodiment may be applied to the recording system 2 according to the foregoing embodiment.

Although the description has been given with reference to some embodiments and modification examples, and specific application examples thereof, the present technology is not limited to these embodiments, etc., and may be modified in a variety of ways.

For example, in the foregoing respective embodiments, etc., the visitor 5 holds the wristband over the drawing device to record information. On this occasion, the visitor 5 may hold the wristband over the drawing device while wearing the wristband around his wrist, or may take off the wristband from the wrist and hold only the wristband over the drawing device.

Moreover, in the foregoing respective embodiments, etc., information is recorded on the wristband; however, the present technology is not limited thereto. Information may be recorded on any device portable by a user. A device wearable on a part of a body of the user is desirable. Specifically, a ring-type recording medium and a card-type recording medium may be used. In a case where the card-type recording medium is used, for example, the user desirably wears the card-type recording medium with use of a neck strap, for example.

It is to be noted that the effects described herein are merely illustrative and non-limiting, and other effects may be included.

It is to be noted that the present technology may have the following configurations.

(1)

A recording device including:

a writer that rewrites schedule information visibly recorded on a recording medium and corresponding to a time from first schedule information to second schedule information; and a generator that generates the second schedule information on the basis of a time.

(2)

The recording device according to (1), in which the generator generates the second schedule information also on the basis of historical data corresponding to the recording medium in addition to the time.

(3)

The recording device according to (2), further including a reader that reads information visibly recorded on the recording medium, in which identification information corresponding to the recording medium is further visibly recorded on the recording medium, the reader reads the identification information recorded on the recording medium, and the generator obtains, on the basis of the identification information read by the reader, the historical data with use of a database in which the identification information and the historical data corresponding to each other are stored.

(4)

The recording device according to (3), in which the generator further updates the historical data to update the database on the basis of the updated historical data.

(5)

The recording device according to (3) or (4), in which the database is stored in an information processing device.

(6)

The recording device according to any one of (3) to (5), in which the identification information is recorded on the recording medium with use of a visible pattern.

(7)

The recording device according to (2), further including a reader that reads information visibly recorded on the recording medium, in which the historical data is visibly recorded on the recording medium, and the reader reads the historical data recorded on the recording medium.

(8)

The recording device according to (7), in which the writer rewrites the historical data recorded on the recording medium from first historical data to second historical data, and the generator further generates the second historical data on the basis of the first historical data.

(9)

The recording device according to (8), in which the writer rewrites a pattern visibly recorded on the recording medium and corresponding to the historical data from a first pattern to a second pattern to rewrite the historical data, and the generator generates the second pattern on the basis of the historical data.

(10)

The recording device according to (9), in which the generator generates the second pattern also on the basis of site information of an information processing device in addition to the historical data.

(11)

The recording device according to any one of (2) to (10), in which the generator generates the second schedule information also on the basis of predetermined schedule data.

(12)

The recording device according to any one of (2) to (11), in which the writer further updates history information visibly recorded on the recording medium and indicating a history of the recording medium from first history information to second history information, and the generator generates the second history information on the basis of the historical data.

(13)

The recording device according to any one of (1) to (12), in which the recording medium is wearable by a user.

(14)

The recording device according to (13), in which the recording medium has a wristband shape.

(15)

The recording device according to any one of (1) to (14), in which the recording medium includes a recording layer having a state that is reversibly switchable between a colored state and a colorless state.

(16)

The recording device according to (15), in which the recording layer includes a leuco dye.

(17)

A recording system including:

a recording device including a writer and a generator, the writer that rewrites schedule information visibly recorded on a recording medium and corresponding to a time from first schedule information to second schedule information, and the generator that generates the second schedule information on the basis of a time and historical data corresponding to the recording medium; and an information processing device that accumulates the historical data.

(18)

The recording system according to (17), in which the recording device further includes a reader that reads information visibly recorded on the recording medium, identification information corresponding to the recording medium is further visibly recorded on the recording medium, the information processing device includes a database in which the identification information and the historical data corresponding to each other are stored, the reader reads the identification information recorded on the recording medium, and the generator obtains the historical data from the information processing device on the basis of the identification information read by the reader.

(19)

The recording system according to (18), further including a terminal device including a terminal reader and a processor, the terminal reader that reads information visibly recorded on the recording medium, in which site information of the information processing device is also visibly recorded on the recording medium, the terminal reader reads the identification information and the site information that are recorded on the recording medium, the processor accesses the information processing device on the basis of the site information read by the terminal reader, and supplies the identification information read by the terminal reader to the information processing device, and the information processing device performs predetermined processing corresponding to the identification information on the terminal device.

(20)

A recording system including:

a recording device including a writer and a generator, the writer that rewrites schedule information visibly recorded on a recording medium and corresponding to a time from first schedule information to second schedule information, and the generator that generates the second schedule information on the basis of a time and historical data corresponding to the recording medium; and an information processing device that performs predetermined processing corresponding to the historical data.

(21)

The recording system according to (20), further including a terminal device including a terminal reader that reads information visibly recorded on the recording medium, in which identification information corresponding to the recording medium is also visibly recorded on the recording medium, the information processing device includes a database in which the identification information and the historical data corresponding to each other are stored, the terminal reader reads the identification information recorded on the recording medium, and the information processing device obtains the historical data on the basis of the identification information read by the terminal reader.

(22)

The recording system according to (20), further including a terminal device including a terminal reader that reads information visibly recorded on the recording medium, in which the historical data is visibly recorded on the recording medium, the terminal reader reads the historical data recorded on the recording medium, and the information processing device obtains the historical data read by the terminal reader.

It should be understood by those skilled in the art that various modifications, combinations, sub-combinations, and alterations may occur depending on design requirements and other factors insofar as they are within the scope of the appended claims or the equivalents thereof.

The invention claimed is:

1. A recording device comprising:
   a writer that rewrites schedule information visibly recorded on a recording medium and corresponding to a time from first schedule information to second schedule information;
   a generator that generates the second schedule information on a basis of a time, wherein the generator generates the second schedule information also on a basis of historical data corresponding to the recording medium in addition to the time; and
   a reader that reads information visibly recorded on the recording medium,
   wherein identification information corresponding to the recording medium is further visibly recorded on the recording medium,
   wherein the reader reads the identification information recorded on the recording medium, and
   wherein the generator obtains, on a basis of the identification information read by the reader, the historical data with use of a database in which the identification information and the historical data corresponding to each other are stored.

2. The recording device according to claim 1, wherein the generator further updates the historical data to update the database on a basis of the updated historical data.

3. The recording device according to claim 1, wherein the database is stored in an information processing device.

4. The recording device according to claim 1, wherein the identification information is recorded on the recording medium with use of a visible pattern.

5. The recording device according to claim 1, further comprising a reader that reads information visibly recorded on the recording medium, wherein
   the historical data is visibly recorded on the recording medium, and
   the reader reads the historical data recorded on the recording medium.

6. The recording device according to claim 5, wherein
   the writer rewrites the historical data recorded on the recording medium from first historical data to second historical data, and
   the generator further generates the second historical data on a basis of the first historical data.

7. The recording device according to claim 6, wherein
   the writer rewrites a pattern visibly recorded on the recording medium and corresponding to the historical data from a first pattern to a second pattern to rewrite the historical data, and
   the generator generates the second pattern on a basis of the historical data.

8. The recording device according to claim 7, wherein the generator generates the second pattern also on a basis of site information of an information processing device in addition to the historical data.

9. The recording device according to claim 1, wherein the generator generates the second schedule information also on a basis of predetermined schedule data.

10. The recording device according to claim 1, wherein
    the writer further updates history information visibly recorded on the recording medium and indicating a history of the recording medium from first history information to second history information, and
    the generator generates the second history information on a basis of the historical data.

11. The recording device according to claim 1, wherein the recording medium is wearable by a user.

12. The recording device according to claim 11, wherein the recording medium has a wristband shape.

13. The recording device according to claim 1, wherein the recording medium includes a recording layer having a state that is reversibly switchable between a colored state and a colorless state.

14. The recording device according to claim 13, wherein the recording layer includes a leuco dye.

15. A recording system comprising:
    a recording device including a writer and a generator, the writer that rewrites schedule information visibly recorded on a recording medium and corresponding to a time from first schedule information to second schedule information, and the generator that generates the second schedule information on a basis of a time and historical data corresponding to the recording medium; and
    an information processing device that accumulates the historical data,
    wherein the recording device further includes a reader that reads information visibly recorded on the recording medium,
    wherein identification information corresponding to the recording medium is further visibly recorded on the recording medium,
    wherein the information processing device includes a database in which the identification information and the historical data corresponding to each other are stored,
    wherein the reader reads the identification information recorded on the recording medium, and
    wherein the generator obtains the historical data from the information processing device on a basis of the identification information read by the reader.

16. The recording system according to claim 15, further comprising a terminal device including a terminal reader and a processor, the terminal reader that reads information visibly recorded on the recording medium, wherein
    site information of the information processing device is also visibly recorded on the recording medium,
    the terminal reader reads the identification information and the site information that are recorded on the recording medium,
    the processor accesses the information processing device on a basis of the site information read by the terminal reader, and supplies the identification information read by the terminal reader to the information processing device, and the information processing device performs predetermined processing corresponding to the identification information on the terminal device.

17. A recording system comprising:

a recording device including a writer and a generator, the writer that rewrites schedule information visibly recorded on a recording medium and corresponding to a time from first schedule information to second schedule information, and the generator that generates the second schedule information on a basis of a time and historical data corresponding to the recording medium;

an information processing device that performs predetermined processing corresponding to the historical data; and a terminal device including a terminal reader that reads information visibly recorded on the recording medium, wherein identification information corresponding to the recording medium is also visibly recorded on the recording medium, wherein the information processing device includes a database in which the identification information and the historical data corresponding to each other are stored, wherein the terminal reader reads the identification information recorded on the recording medium, and wherein the information processing device obtains the historical data on a basis of the identification information read by the terminal reader.

18. The recording system according to claim 17, further comprising a terminal device including a terminal reader that reads information visibly recorded on the recording medium, wherein the historical data is visibly recorded on the recording medium, the terminal reader reads the historical data recorded on the recording medium, and the information processing device obtains the historical data read by the terminal reader.

* * * * *